(12) United States Patent
Hawkins et al.

(10) Patent No.: US 11,100,414 B2
(45) Date of Patent: Aug. 24, 2021

(54) INFERENCING AND LEARNING BASED ON SENSORIMOTOR INPUT DATA

(71) Applicant: Numenta, Inc., Redwood City, CA (US)

(72) Inventors: Jeffrey C. Hawkins, Atherton, CA (US); Subutai Ahmad, Palo Alto, CA (US)

(73) Assignee: Numenta, Inc., Redwood City, CA (US)

( * ) Notice: Subject to any disclaimer, the term of this patent is extended or adjusted under 35 U.S.C. 154(b) by 224 days.

(21) Appl. No.: 16/268,148

(22) Filed: Feb. 5, 2019

(65) Prior Publication Data

US 2019/0171954 A1 Jun. 6, 2019

Related U.S. Application Data

(63) Continuation-in-part of application No. 15/594,077, filed on May 12, 2017.

(Continued)

(51) Int. Cl.
*G06N 5/04* (2006.01)
*G06K 9/62* (2006.01)
(Continued)

(52) U.S. Cl.
CPC ......... *G06N 5/046* (2013.01); *G06K 9/00979* (2013.01); *G06K 9/00986* (2013.01);
(Continued)

(58) Field of Classification Search
CPC ............. G06K 9/6289; G06K 9/00973; G06K 9/00979; G05B 2219/40053
See application file for complete search history.

(56) References Cited

U.S. PATENT DOCUMENTS 8,160,309 B1 4/2012 Tzur et al.
9,098,741 B1 8/2015 Anguelov et al.
(Continued)

OTHER PUBLICATIONS

Gordon, Iryna et al.; What and Where: 3D Object Recognition with Accurate Pose; s first presented at the International Symposium on Mixed and Augmented Reality, 2004 [8]; pp. 1-16. (Year: 2004).*

(Continued)

*Primary Examiner* — Stanley K. Hill
(74) *Attorney, Agent, or Firm* — Fenwick & West LLP

(57) ABSTRACT

One or more multi-layer systems are used to perform inference. A multi-layer system may correspond to a node that receives a set of sensory input data for hierarchical processing, and may be grouped to perform processing for sensory input data. Inference systems at lower layers of a multi-layer system pass representation of objects to inference systems at higher layers. Each inference system can perform inference and form their own versions of representations of objects, regardless of the level and layer of the inference systems. The set of candidate objects for each inference system is updated to those consistent with feature-location representations for the sensors as well as object representations at lower layers. The set of candidate objects is also updated to those consistent with candidate objects from other inference systems, such as inference systems at other layers of the hierarchy or inference systems included in other multi-layer systems.

27 Claims, 26 Drawing Sheets

Related U.S. Application Data

(60) Provisional application No. 62/335,995, filed on May 13, 2016.

(51) Int. Cl.
  *G06K 9/00* (2006.01)
  *G06N 3/04* (2006.01)
  *G06N 3/063* (2006.01)

(52) U.S. Cl.
  CPC ............ *G06K 9/6289* (2013.01); *G06N 3/04* (2013.01); *G06N 3/063* (2013.01); *G06N 5/045* (2013.01); *G05B 2219/40053* (2013.01)

(56) References Cited

U.S. PATENT DOCUMENTS

| | | | |
|---|---|---|---|
| 9,102,055 B1* | 8/2015 | Konolige | B65G 47/50 |
| 2011/0085702 A1 | 4/2011 | Nevatia et al. | |
| 2015/0269484 A1 | 9/2015 | Hawkins et al. | |
| 2016/0092736 A1 | 3/2016 | Mai et al. | |
| 2016/0217164 A1 | 7/2016 | Hawkins et al. | |
| 2017/0330091 A1 | 11/2017 | Hawkins et al. | |
| 2018/0276464 A1 | 9/2018 | Hawkins et al. | |
| 2019/0381670 A1* | 12/2019 | Correll | B25J 9/106 |

OTHER PUBLICATIONS

Collet, Alvaro et al.; Object Recognition and Full Pose Registration from a Single Image for Robotic Manipulation; 8 pages. (Year: 2009).*

Soria, Pablo Ramon et al.; Detection, Location and Grasping Objects Using a Stereo Sensor on UAV in Outdoor Environments; Sensors 2017, 17, 103; doi:10.3390/s17010103; pp. 1-16. (Year: 2017).*

PCT International Search Report and Written Opinion, PCT Application No. PCT/US20/14670, dated Apr. 23, 2020, 13 pages.

Hawkins, J. et al., "3D Object Learning with Cortical Columns," Computational and Systems Neuroscience (Cosyne) 2017, Feb. 24, 2017, one page.

PCT International Preliminary Report on Patentability, PCT Application No. PCT/US2017/032464, dated Nov. 13, 2018, ten pages.

United States Office Action, U.S. Appl. No. 15/594,077, dated Jun. 10, 2020, eight pages.

Bosking, W.H. et al., "Orientation Selectivity and the Arrangement of Horizontal Connections in Tree Shrew Striate Cortex," The Journal of Neuroscience, Mar. 15, 1997, pp. 2112-2127, vol. 17.

Gur, M. et al., "Physiological Differences Between Neurons in Layer 2 and Layer 3 of Primary Visual Cortex (V1) of Alert Macaque Monkeys," J. Physiol., 2008, pp. 2293-2306, vol. 586, No. 9.

Hawkins, J. et al., "Why Neurons Have Thousands of Synapses, a Theory of Sequence Memory in Neocortex," Frontiers in Neural Circuits, Mar. 2016, pp. 1-13, vol. 10, Article 23.

PCT International Search Report and Written Opinion, PCT Application No. PCT/US17/32464, dated Jul. 26, 2017, 19 pages.

Thomson, A.M. et al., "Interlaminar Connections in the Neocortex," Cerebral Cortex, 2003, pp. 5-14, vol. 13, Issue 1.

Von Der Heydt, R., "Figure-Ground Organization and the Emergence of Proto-Objects in the Visual Cortex," Frontiers in Psychology, Nov. 3, 2015, pp. 1-10, vol. 6, Article 1695.

Hawkins, J. et al., "A Framework for Intelligence and Cortical Function Based on Grid Cells in the Neocortex," Oct. 13, 2018, pp. 1-15.

* cited by examiner

Cube Object    Wedge Object

INFERENCING AND LEARNING BASED ON SENSORIMOTOR INPUT DATA

CROSS-REFERENCE TO RELATED APPLICATION

This application is a continuation-in-part application of U.S. application Ser. No. 15/594,077 filed on May 12, 2017, which claims priority under 35 U.S.C. § 119(e) to U.S. Patent Application No. 62/335,995 filed on May 13, 2016, all of which are incorporated by reference herein in its entirety.

BACKGROUND

1. Field of the Disclosure

The present disclosure relates to performing inference on received input data, and specifically relates to performing inference based on sensorimotor input data.

2. Description of the Related Arts

Object detection systems aim to find or recognize different types of objects present in input data. The input data for object detection may be in the form of image data, video data, tactile data or other types of sensor data. For example, an object detection system may recognize different objects, such as a coffee cup, a door, and the like, included in visual images that are captured by a camera or sensed by tactile sensors.

Conventional object detection systems face many challenges. One of such challenges is that the same object may be placed in different locations and/or orientations. The change in the locations and/or orientations of the objects from the originally learned locations and/or orientation may cause the conventional object detection systems to recognize the same object as different objects. Such problem may be more acute when tactile sensors on, for example, a robotic hand are used to recognize an object. Existing object detection models, such as convolutional neural network models (CNN), are not always sufficient to address the changes in the location and/or locations, and often require significant amounts of training data even if they do address such changes.

Moreover, regardless of the types of sensors, the input data including a representation of an object has spatial features that would distinguish from a representation of another object. The absence of spatially distinctive features may give rise to ambiguity as to the object being recognized. Conventional object detection systems do not adequately address such ambiguity in the objects being recognized.

SUMMARY

Embodiments relate to performing inference by generating input representations of location and feature pairs, and generating output representations indicating candidates likely to be associated with the location and feature pairs. A first input processor generates a first input representation indicating potential of a first pair of a first location and a first feature at the first location being detected. A first output processor determines a first output representation corresponding to the first input representation. The first output representation indicates one or more candidates likely to be associated with the first pair. The first input processor generates a second input representation indicating potential of a second pair of a second location and a second feature at the second location subsequent to generating the first input representation. The first output processor determines a second output representation corresponding to the first input representation and the second input representation. The second output representation indicates one or more candidates likely to be associated with the first pair and the second pair.

In one embodiment, a feedback signal representing a prediction on the second input representation is generated in the first output processor based on the first output representation. The second input representation is generated in the first input processor based further on the feedback signal.

In one embodiment, an output representation corresponding to a cause is maintained active in the first output processor during training. Training input representations for pairs of locations and corresponding features associated with the cause for the training are generated in the first input processor. The training input representations are associated with the output representation corresponding to the cause.

In one embodiment, the first input representation is an activation state of a first subset of input cells in the first input processor and the second input representation is an activation state of a second subset of the input cells in the first input processor.

In one embodiment, the first location is one of a plurality of potential locations in the one or more candidates likely to be associated with the first pair.

In one embodiment, the first input representation indicates activation of a union of pairs of the first feature and each of the potential locations.

In one embodiment, the first output representation further indicates one or more candidates likely associated with the union of pairs of the first feature and each of the potential locations.

In one embodiment, the second location is one of another plurality of potential locations generated by shifting each potential location in the plurality of potential locations by a predetermined distance.

In one embodiment, the second input representation indicates an activation of a union of pairs of the second feature and one or more of the potential locations in the other plurality of potential locations that are associated with the one or more candidates indicated by the first output representation.

In one embodiment, the second subsets of the input cells in the first input processor are activated responsive to the second subsets of input cells receiving location signals representing the second location and activation signals associated with the second feature.

In one embodiment, the second subset of the input cells in the first input processor are activated based further on a feedback signal associated with the first output representation.

In one embodiment, each of the one or more candidates is represented by a corresponding activation state of a subset of output cells in the first output processor, and the feedback signal indicates the activation state of the subset of output cells.

In one embodiment, the second output representation is an activation state of a subset of output cells in the first output processor.

In one embodiment, the subset of the output cells in the first output processor are activated responsive to the subset of output cells receiving feedforward signals corresponding to the second input representation.

In one embodiment, the feedforward signals are sent from activated subset of input cells in the first input processor associated with the second input representation to the subset of the output cells in the first output processor connected to the activated subset of the input cells.

In one embodiment, first location information indicating the first location in a sparse distributed representation is received. The first input representation is generated based on the first location information. The second location information indicating the second location in a sparse distributed representation is received. The second input representation is generated based on the second location information.

In one embodiment, a first sensory input indicating the first feature from a sensor is received in the first input processor. The first input representation is generated based on the first sensory input. A second sensory input indicating the second feature from the sensor is received in the first input processor after receiving the first sensory input. The second input representation is generated based on the second sensory input.

In one embodiment, a third sensory input indicating a third feature from another sensor is received at a second input processor. A third input representation of a third pair of the third feature and a third location corresponding to the third feature is generated at a second output processor. Activation states of a subset of other output cells in the second output processor corresponding to the third input representation are determined. The activation states of the subset of the other output cells indicates one or more candidates likely to be associated with the third pair. The activation states of the subset of the other output cells in the second output processor are sent to one or more of the output cells in the first output processor connected to the other output cells. The activation of the one or more of the output cells in the first output processor are based further on the activation states of the subset of the other output cells in the second output processor.

In one embodiment, a third input representation of a third pair of a third location and a third feature at the third location is generated by a second input processor. A third output representation corresponding to the third input representation is determined at a second output processor. The third output representation indicates one or more candidates likely to be associated with the third pair. The third output representation is sent from the second output processor to the first output processor for determining the second output representation.

In one embodiment, the one or more candidates are objects, and the first and second locations are allocentric locations of candidate objects.

Embodiments also relate to performing inference by parallel processing location and feature pairs at two or more input processors and corresponding output processors. A first input representation indicating potential of a first pair of a first location and a first feature at the first location being detected is generated at a first input process. A second input processor generates a second input representation indicating potential of a second pair of a second location and a second feature at the second location being detected. A first output processor determines a first output representation corresponding to the first input representation. The first output representation indicates one or more candidates likely to be associated with the first pair. A second input processor generates a second input representation indicating potential of a second pair of a second location and a second feature at the second location being detected. A second output processor determines a second output representation corresponding to the first output representation and the second input representation. The second output representation indicates one or more candidates likely to be associated with the first pair and the second pair.

In one embodiment, the first output processor generates an updated first output representation based on the first output representation and the second output representation to indicate one or more candidates likely to be associated with the first pair and the second pair.

Embodiments relate to a method of performing inference using a plurality of inference systems. A first input representation by processing first sensory input indicating potential of a first pair of a first location and a first feature at the first location being detected is generated by a first input processor in a first inference system at a first layer of a multi-layer system. A first output representation corresponding to the first input representation by processing the first output representation is determined by a first output processor in the first inference system. The first output representation indicates a first set of candidates associated with the first pair. A second input representation corresponding to at least the first output representation of the first output processor is generated by processing the first output representation by a second input processor in a second inference system at a second layer of the multi-layer system higher than the first layer. A second output representation corresponding to the second input representation is determined by processing the second input representation by a second output processor in the second inference system. The second output representation indicates a second set of candidates likely to be associated with at least the first pair.

In one embodiment, the first sensory input is received from a first sensor, and the first input representation is generated by further processing the first sensory input, and the second input representation is generated by further processing the first sensory input at the second input processor.

In one embodiment, a third input representation is generated by processing second sensory input indicating potential of a second pair of a second feature and a second location corresponding to the second feature by a third input processor in a third inference system at the first layer. A third output representation corresponding to the third input representation is determined by a third output processor in the third inference system. The third output representation indicates a third set of candidates likely to be associated with the second pair. The first output representation is an activation state of a subset of output cells in the first output processor and the third output representation is an activation state of a subset of output cells in the third output processor. The second input representation at the second layer is generated by processing at least the activation states of the subset of output cells in the first output representation and the activation states of the subset of output cells in the third output representation.

In one embodiment, the first output representation is an activation state of a subset of output cells in the first output processor, and the second output representation is an activation state of a subset of output cells in the second output processor.

In one embodiment, the method further comprises sending the activation states of the subset of the output cells in the first output processor to columns of input cells in the second input processor to generate the second input representation.

In one embodiment, a subset of cells is activated in a third inference system of another multi-layer system, and the activation states of the subset of the cells in the third output processor are sent to one or more of the output cells of the first output processor or the second output processor. Activation of the one or more of the output cells in the first output processor or the second output processor is based further on the activation states of the subset of the cells in the third inference system.

In one embodiment, the subset of cells in the third inference system is activated by processing second sensory input received from a second sensor of a modality different from a modality of the first sensor.

In one embodiment, the first output representation is determined by further processing activation states of output cells in a third inference system at a level other than the first level.

In one embodiment, the second output representation is determined by further processing activation states of output cells in a third inference system at a level other than the second level.

BRIEF DESCRIPTION OF THE DRAWINGS

The teachings of the embodiments can be readily understood by considering the following detailed description in conjunction with the accompanying drawings.

Figure (FIG.)

DETAILED DESCRIPTION OF EMBODIMENTS

Figure 1:
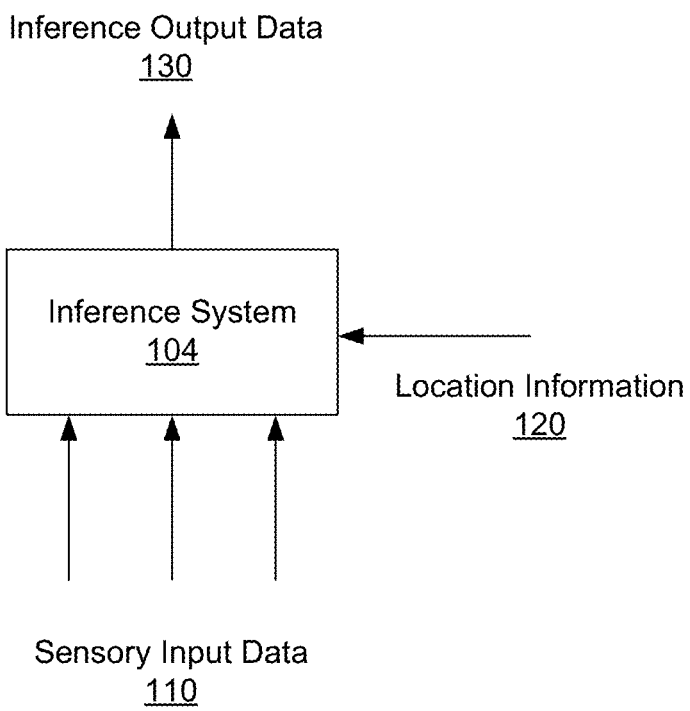
FIG. 1 is a conceptual diagram of an inference system, according to an embodiment.

In the following description of embodiments, numerous specific details are set forth in order to provide more thorough understanding. However, note that the present invention may be practiced without one or more of these specific details. In other instances, well-known features have not been described in detail to avoid unnecessarily complicating the description.

A preferred embodiment is now described with reference to the figures where like reference numbers indicate identical or functionally similar elements. Also in the figures, the left most digits of each reference number corresponds to the figure in which the reference number is first used.

Certain aspects of the embodiments include process steps and instructions described herein in the form of an algorithm. It should be noted that the process steps and instructions of the embodiments could be embodied in software, firmware or hardware, and when embodied in software, could be downloaded to reside on and be operated from different platforms used by a variety of operating systems.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The language used in the specification has been principally selected for readability and instructional purposes, and may not have been selected to delineate or circumscribe the inventive subject matter. Accordingly, the disclosure set forth herein is intended to be illustrative, but not limiting, of the scope, which is set forth in the claims. Embodiments relate to performing inference using one or more multi-layer systems. A multi-layer system includes a plurality of inference systems arranged in one or more hierarchical layers. A multi-layer system may correspond to a node that receives a set of sensory input data for hierarchical processing, and may be grouped to perform processing for sensory input data associated with different sensor characteristics or sensor modalities. Inference systems at lower layers of a multi-layer system pass representation of objects to inference systems at higher layers. Each inference system in a multi-layer system can perform inference and form their own versions of representations of objects, regardless of the level and layer of the inference systems. The set of candidate objects for each inference system is updated to those consistent with feature-location representations for the sensors as well as object representations from inference systems at lower layers. In addition, the set of candidate objects is updated to those consistent with candidate objects from other inference systems, such as inference systems at other layers of the hierarchy or inference systems included in other multi-layer systems.

High-Level Overview of Inference System

FIG. 1 is a conceptual diagram of an inference system 104, according to one embodiment. The inference system 104 performs inference based on sensory input data 110 received from a set of sensors that move relative to the world, and location information 120 associated with the sensory input data 110. In one particular embodiment referred throughout the remainder of the specification, the inference system 104 performs inference on objects and generates inference output data 130. For example, the inference system 104 may receive sensory input data 110 corresponding to sensors on different locations on an unknown object, and perform object recognition based on the received inputs. As another example, the inference system 104 can predict sensory input data 110 at a particular location on a given object. However, it is appreciated that in other embodiments, the inference system 104 may be applied to any situation where a set of sensors probe different locations of a system. For example, the inference system 104 may be applied to inputs received from an online probe that navigates and measures different parts of a network in the cloud.

The sensory input data 110 may include, among others, images, videos, audio signals, sensor signals (e.g., tactile sensor signals), data related to network traffic, financial transaction data, communication signals (e.g., emails, text messages and instant messages), documents, insurance records, biometric information, parameters for manufacturing process (e.g., semiconductor fabrication parameters), inventory patterns, energy or power usage patterns, data representing genes, results of scientific experiments or parameters associated with operation of a machine (e.g., vehicle operation) and medical treatment data. The underlying representation (e.g., photo, audio and etc.) can be stored in a non-transitory storage medium. In the following, the embodiments are described primarily with reference to a set of tactile sensors on a robotic hand, merely to facilitate explanation and understanding of the inference system 104. In one embodiment, the sensory input data 110 is encoded into a vector signal and fed to the inference system 104.

The location information 120 represents a location associated with sensors generating the sensory input data 110. The location may be physical location, logical location or a combination of both. The received location information 120 is encoded in a sparse distributed representation using, for example, a method as described in U.S. Patent Publication No. 2016/0217164, which is incorporated by reference herein in its entirety.

In one embodiment, the location information 120 encodes location using an allocentric frame of reference, or an object-centric frame of reference. In other words, the location coordinates are determined relative to the object itself, rather than relative to the system containing the sensors. As described in more detail below, the location information 120 may contain known allocentric locations of the sensors, or a set of potential locations of the sensors.

The inference system 104 may process the sensory input data 110 and location information 120 to produce an output representing, among others, identification of objects, identification of recognized gestures, classification of digital images as pornographic or non-pornographic, identification of email messages as unsolicited bulk email ('spam') or legitimate email ('non-spam'), identification of a speaker in an audio recording, classification of loan applicants as good or bad credit risks, identification of network traffic as malicious or benign, identity of a person appearing in the image, processed natural language processing, weather forecast results, patterns of a person's behavior, control signals for machines (e.g., automatic vehicle navigation), gene expression and protein interactions, analytic information on access to resources on a network, parameters for optimizing a manufacturing process, identification of anomalous patterns in insurance records, prediction on results of experiments, indication of illness that a person is likely to experience, selection of contents that may be of interest to a user, indication on prediction of a person's behavior (e.g., ticket purchase, no-show behavior), prediction on election, prediction/detection of adverse events, a string of texts in the image, indication representing topic in text, and a summary of text or prediction on reaction to medical treatments. In the following, the embodiments are described primarily with reference to the inference system that recognizes objects to facilitate explanation and understanding of the inference system 104.

Figure 2:
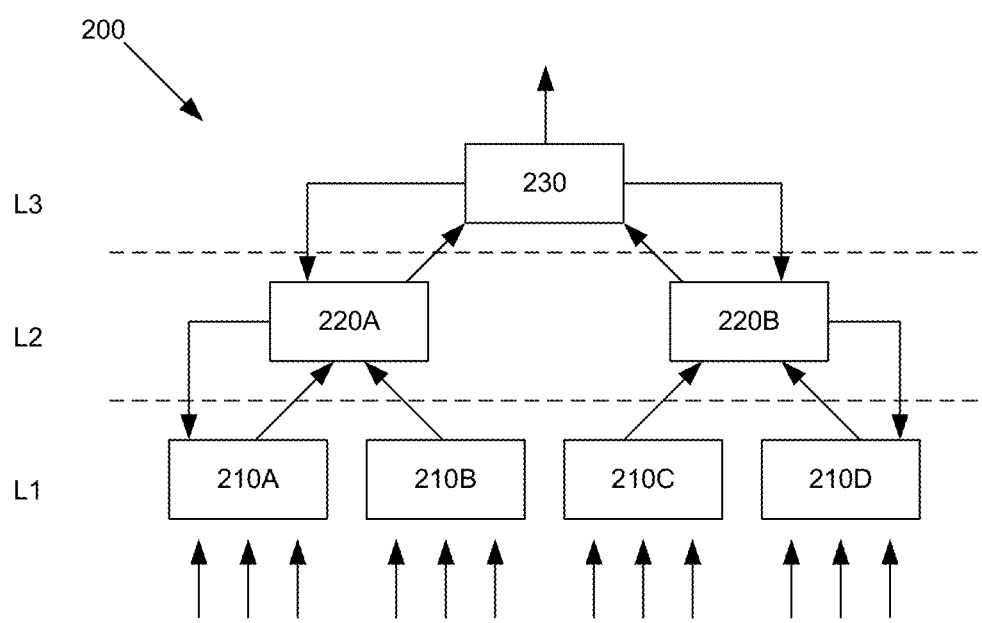
FIG. 2 is a conceptual diagram of inference systems organized in a hierarchical manner, according to one embodiment.

FIG. 2 is a conceptual diagram of multiple inference systems organized in a hierarchical manner, according to one embodiment. Such a hierarchical structured system is referred to as a hierarchical inference system 200. In a hierarchical inference system 200, multiple nodes learn to perform inference and predict at different levels of abstraction. The system 200 has three levels L1, L2, and L3, where level L1 is the lowest level, level L3 is the highest level, and level L2 is an intermediate level between levels L1 and L3. The hierarchical inference system 200 is hierarchically structured so that the processing nodes cover a larger input space as the level ascends. Level L1 includes nodes 210A, 210B, 210C, and 210D; level L2 includes nodes 220A and 220B; and level L3 has node 230. Nodes 210A, 210B, 210C, 210D, 220A, 220B, and 230 are hierarchically connected in a tree-like structure such that each node has several children nodes (that is, nodes connected at a lower level) and one parent node (that is, a node connected at a higher level). In one embodiment, a node at a child node may be connected to multiple parent nodes. For example, node 210B may be connected to nodes at 220A and 220B.

Further, the hierarchical inference system 200 propagates inference output data up the hierarchy and propagates top-down signals down the hierarchy. That is, each node 210A, 210B, 210C, 210D, 220A, 220B, and 230 may be arranged (i) to propagate information up the hierarchy to a connected parent node, and (ii) to propagate information down the hierarchy to any connected children nodes.

Such a hierarchical inference system 200 is advantageous, among other reasons, when learning is performed by a first set of sensors, but inference is performed by a second set of sensors different from the first set. For example, the node 220A associated with a set of tactile sensors may be used to learn objects, and the node 220B associated with a set of image sensors may be used to perform inference on the object. Another advantage is the increased capacity to learn using multiple nodes. The number of levels and arrangement of processing modes in FIGS. 1 and 2 are merely illustrative. Many variants of a hierarchical inference system may be developed and deployed depending on the specific application.

Example Object Recognition

An object can be characterized by a set of features at corresponding locations. Different objects can be defined by a set of different pairs of features and locations that appear on the object. By identifying the different feature-location representations as they appear during inference, different objects can be recognized. If two objects share some feature-location representations, the two objects may be indistinguishable until a distinctive location-feature combination is encountered.

For the purpose of illustration, the inference system 104 is assumed to detect objects based on received sensory input data 110 (for example, in the form of tactile sensor data) and corresponding location information 120 indicating the location of a tactile sensor on a robotic arm. As the combinations of features (as indicated by the sensory input data 110) and location information 120 are received, the inference system 104 identifies one or more candidate objects consistent with the observed feature-location representations. As additional sensory input data 110 and location information 120 are received, the inference system 104 narrows the candidate objects to those that are consistent with the new observed feature-location representation. The inference system 104 outputs the current set of candidate objects as inference output data 130.

Figure 3:
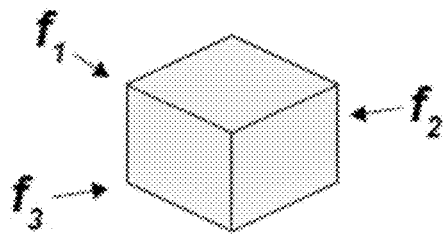
FIG. 3 is an example illustration of a cube object and a wedge object characterized by the inference system, according to one embodiment.
Figure 3:
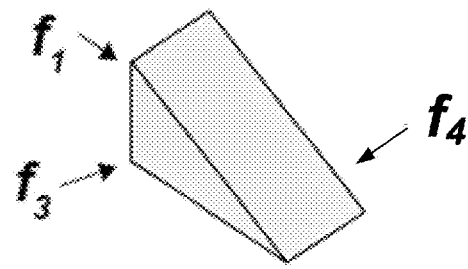
Figure 3:
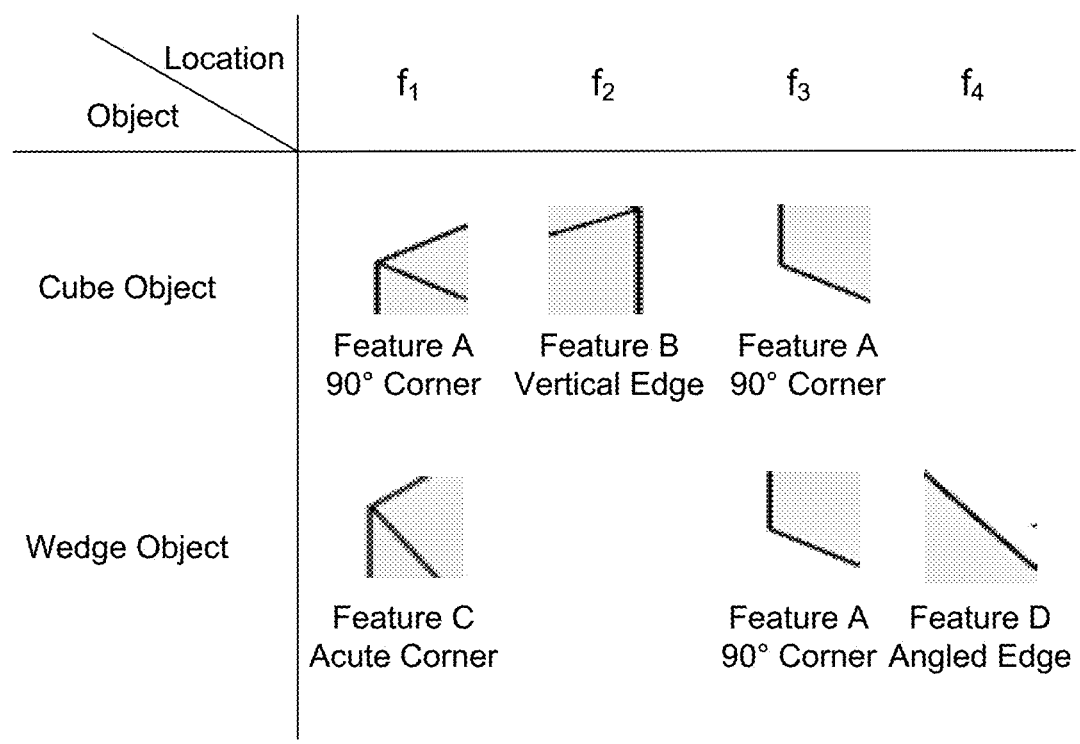

FIG. 3 is an example illustration of a cube object and a wedge object characterized by the inference system 104, according to one embodiment. As shown in FIG. 3, for example, a set of allocentric locations $\{f_1, f_2, f_3, f_4\}$ are defined for objects. A cube object can be characterized by pairs of spatial features and locations, i.e., spatial feature A representing a 90° corner at location $f_1$, spatial feature B representing a vertical edge at location $f_2$, and spatial feature A at location $f_3$. Similarly, a wedge object can be characterized by different pairs of spatial features and locations, i.e., spatial feature C representing an acute corner at location $f_1$, spatial feature A at location $f_3$, and spatial feature D representing an angled edge at location $f_4$.

In the example of FIG. 3, the inference system 104 first receives sensory input data 110 representing spatial feature A at location $f_3$ of the object. The inference system 104 generates a set of candidate objects {cube, wedge} since both objects have spatial feature A at location $f_3$. The inference system 104 receives an additional sensory input data 110 from the robotic finger representing spatial feature B at location $f_2$. The inference system 104 reduces the set of candidate objects to {cube}, as the cube object is the only object consistent with the observed feature-location representations. The inference system 104 outputs the cube object as inference output data 130.

In another embodiment, when locations of the sensors are initially unknown, the inference system 104 generates a set of candidate objects and a set of candidate feature-location representations. The inference system 104 receives sensory input data 110 and location information 120 associated with the object over time. The inference system 104 updates the set of candidate objects and the set of candidate feature-location representations to those that are consistent with the observed sensory input data 110 and location information 120, until a single object and a single feature-location representation remains. The inference system 104 outputs the remaining object as inference output data 130. In this manner, the inference system 104 can identify objects even if allocentric locations on the object are initially unknown.

Specifically, the inference system 104 receives sensory input data 110 from a sensor at an unknown location on the object. The inference system 104 generates a set of candidate feature-location representations consistent with the received sensory input data 110. Thus, the set represents all potential locations associated with the particular feature. Subsequently, the inference system 104 generates a set of candidate objects consistent with the set of candidate feature-location representations. Thus, the set represents all objects consistent with the candidate feature-location representations.

Returning to the example in FIG. 3, the inference system 104 receives sensory input data 110 from a tactile sensor representing spatial feature A on an unknown location of an object. The inference system 104 generates a set of candidate feature-location representations $\{A\text{-}f_3, A\text{-}f_1\}$ including locations associated with spatial feature A. This implies that the sensor is located at the set of potential locations $\{f_1, f_3\}$ of the object at the current time step. The inference system 104 subsequently generates a set of candidate objects {cube, wedge} since both objects are associated with feature-location representations of spatial feature A at locations $f_1$ or $f_3$.

Then, the inference system 104 receives additional sensory input data 110 from the sensor at a new location on the object and location information 120 indicating an updated set of potential locations. Specifically, the updated set of potential locations are generated based on a determined location shift between the previous location of the sensor and the current location of the sensor on the object. The updated set of locations represents new potential locations of the sensor at the current time step. In one embodiment, the location shift is determined based on movement of the sensors from the previous location to the current location, as determined by one or more controllers controlling movement of actuators for moving the sensors to new locations. For example, a controller may use gyroscope or accelerometer sensors in the robotic finger to determine how much the robotic finger has moved. The determined distance can be transformed into a location shift in the allocentric space. The inference system 104 updates the set of candidate feature-location representations to those that are consistent with the new sensory input data 110 and location information 120, and the set of candidate objects. Subsequently, the inference system 104 updates the set of candidate objects to those that are consistent with the updated set of feature-location representations. In one embodiment, this process is repeated until a single candidate object and a single feature-location representation remain.

In the example in FIG. 3, the inference system 104 receives additional sensory input data 110 from the tactile sensor representing spatial feature D at a new location on the object. The inference system 104 also receives location information 120 including a set of potential locations $\{f_2, f_4\}$ determined based on a location shift of one unit to the right. Specifically, $f_2$ is a location one unit to the right of the previous potential location $f_1$, and $f_4$ is a location one unit to the right of the previous potential location $f_3$. Subsequently, the inference system 104 updates the set of candidate feature-location representations to {D-f$_4$}, as D-f$_4$ is the only combination that is consistent with the updated sensory input data 110 and location information 120, as well as the set of candidate objects. The inference system 104 updates the set of candidate objects to {wedge}, as the wedge object is the only object that is consistent with the feature-location representation D-f$_4$. The object detection system 104 outputs the wedge object as the final detected object as there is only a single object left in the set of candidate objects. The inference system 104 outputs the wedge object as inference output data 130.

In another embodiment, locations of the sensors on the object may be known when performing inference. The inference system 104 receives sensory input data 110 and location information 120 associated with the object over time. The inference system 104 generates and updates the set of candidate objects to those that are consistent with the observed feature-location representations, and outputs the candidate objects as inference output data 130.

In yet another embodiment, the inference system 104 may only receive sensory input data 110, without receiving location information 120. The inference system 104 may generate the set of candidate objects with only the feature information received from the sensory input data 110. Returning to the example in FIG. 3, the inference system 104 receives sensory input data 110 corresponding to Feature B. The inference system 104 may determine that the object is a cube object even without location information 120, since the cube object is the only object having Feature B.

In further embodiments, the inference system 104 may receive sensory input data 110 where corresponding the location information 120 is received for some sensory input data 110 but not others. In such embodiments, the inference system 104 generates and updates the set of candidate objects consistent with the feature-location representations (where the location information is provided) and the features without corresponding locations.

In one embodiment, the inference system 104 learns separate representations of objects for each sensor in the set of sensors based on the sensory input data 110 and location information 120 received from each particular sensor. Thus, responsive to receiving information on an unknown object, the inference system 104 generates a set of candidate objects for each sensor based on at least the feature-location representations received for the sensor. In one embodiment, the inference system 104 determines the set of candidate objects for a sensor based on not only the received feature-location representations for the sensor, but also the set of candidate objects for other sensors. Specifically, for a given time step, the inference system 104 updates the set of candidate objects to those not only consistent with the observed feature-location representations, but also consistent with candidate objects for other sensors. In this manner, the inference system 104 can perform faster inference given sensory input data 110 and location information 120 from a larger number of sensors, since the set of candidate objects for each sensor will quickly settle to an object representation consistent across all sensors.

Returning to the example in FIG. 3, a first tactile sensor on a robotic finger may receive feature-location representations consistent with the set of objects {cube, wedge}. A second tactile sensor on a different robotic finger may receive feature-location representations consistent with the object {cube}. Based on candidate objects of other sensors, the set of candidate objects for the first tactile sensor may be updated to a single object {cube}, since the cube object is the only object consistent across the first and second tactile sensors.

In addition to the advantages described above, the inference system 104 shown in FIG. 1 may perform inference independent of the orientation or location of the object relative to the set of sensors. For example, the inference system 104 can perform inference on a soda can object independent of whether the object is sensed by sensors standing up or lying on its side. The inference system 104 can also perform inference using sensory input data 110 from a subset of sensors different from those used to learn the object representation. For example, the inference system 104 can perform inference on a coffee cup using sensory input data 110 from tactile sensors on second and third robotic fingers different from tactile sensors on first and fourth robotic fingers used to learn the coffee cup object representation.

Architecture of Inference System

Figure 4:
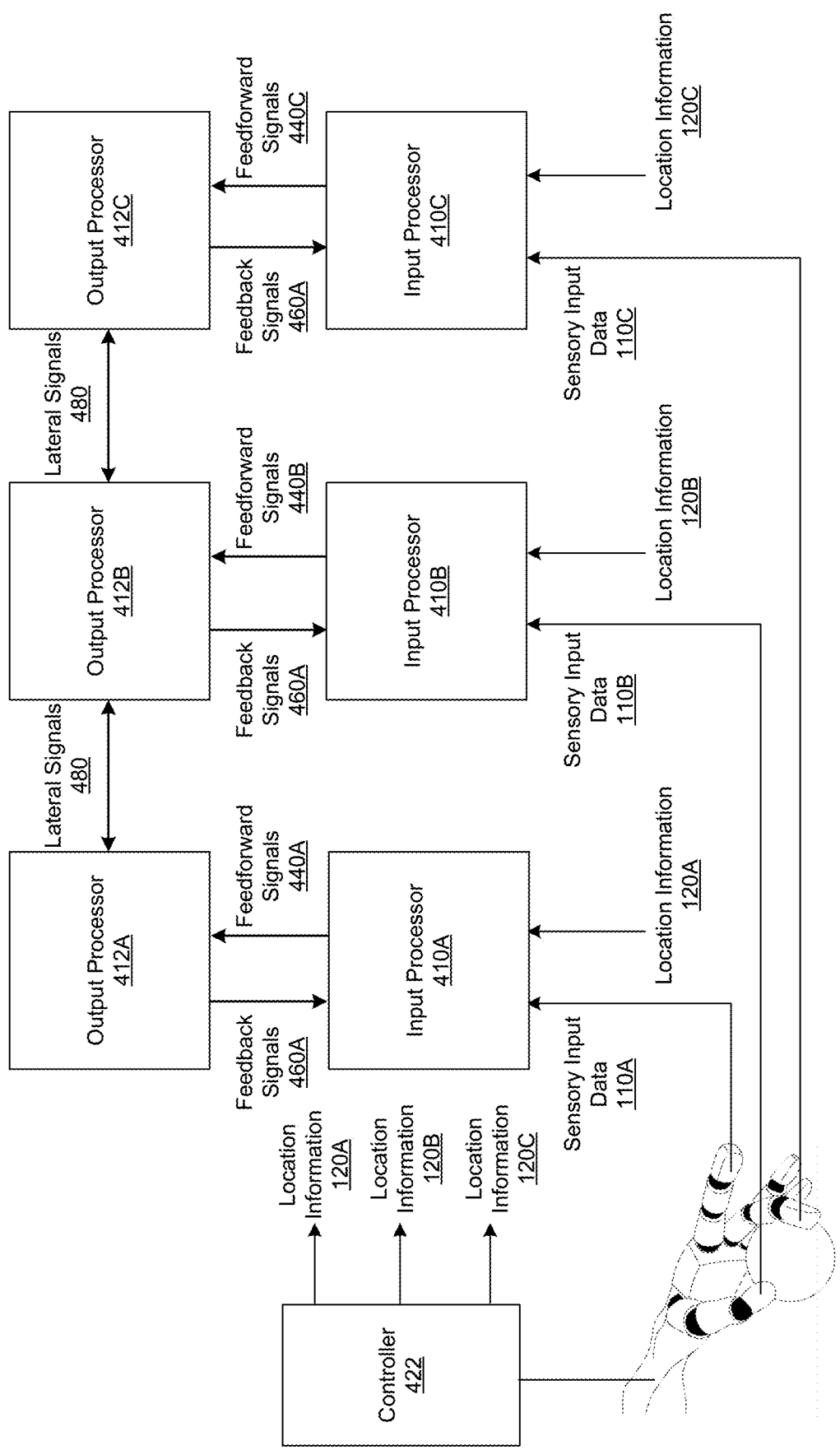
FIG. 4 is an architecture diagram illustrating an inference system, according to one embodiment.

FIG. 4 is a detailed block diagram illustrating an inference system 104, according to one embodiment. The inference system 104 shown in FIG. 4 includes, among other components, input processors 410A, 410B, 410C, output processors 412A, 412B, 412C and a controller 422. Input processor 410A and output processor 412A each correspond to sensor A in a set of sensors. Input processor 410B and output processor 412B each correspond to sensor B in the set of sensors. Input processor 410C and output processor 412C each correspond to sensor C in the set of sensors. Although input and output processors 410A, 410B, 410C, 412A, 412B, 412C corresponding to a set of three sensors A, B, C are shown in FIG. 4, in practice, there may be fewer or more input and output processors depending on the number of sensors. The set of sensors may be the same type of sensors (e.g., tactile sensor) or a combination of different types of sensors (e.g., a visual and a tactile sensor).

The input processor 410 generates candidate feature-location representations. The input processor 410 includes, among other components, a plurality of cells organized into columns. The presence of a particular feature-location representation (e.g., spatial feature A at location $f_3$) is represented by a subset of activated cells in the input processor 410. Thus, a set of candidate feature-location representations are generated by activating the cells associated with each representation in the input processor 410. Specifically, cells in the input processor 410 are activated responsive to receiving sensory input data 110 and location information 120 indicating presence of feature-location representations associated with the cells. Cells in the input processor 410 may also be activated responsive to receiving feedback inputs 460 from output processors 412 indicating that feature-location representations associated with the cells are present in at least one candidate object in the current set of candidate objects. The input processor 410 provides activation states of cells (i.e., presence of feature-location representations) to output processors 412 as feedforward signals 440.

The controller 422 is hardware or a combination of hardware and software for sending operation signals to actuators (e.g., robotic arm) associated with the movement of sensors that provide sensor inputs 110A, 110B, 110C. The controller 422 also functions as a source of location information that may generate and provide allocentric locations of sensors as the location information 120A, 120B, 120C to the input processors 410A, 410B, 410C. For this purpose, the controller 422 may include, among other components, a processor, a memory and an interface device for communicating with the actuators and the sensors. The memory can include software components for controlling and operating the actuators (e.g., a motion planning module and an actuator control algorithm).

The output processor 412 determines a set of candidate objects based on feedforward signals 440 and optionally lateral signals 480. The output processor 412 includes, among other components, a plurality of cells. In one embodiment, the plurality of cells are organized into columns. A subset of activated cells in the output processor 412 represents presence of a particular object (e.g., coffee cup). Thus, a set of candidate objects are represented by activating a union of cells associated with each object in the output processor 412. Specifically, cells in the output processor 412 are activated responsive to receiving feedforward signals 440 from input processors 410 indicating feature-location representations associated with the objects the cells represent. The feedforward signals 440 are received via feedforward connections that are connections between all or a subset of cells in the input processor 410 and a subset of cells in the output processor 412 for transmitting feedforward signals 440. Thus, feedforward connections represent an association between the object represented by the subset of cells in the output processor 412 and the feature-location representation represented by the subset of cells in the input processor 410. In one embodiment, feedforward connections between cells may be severed or generated during the learning process.

In one embodiment, each output processor 412 for a corresponding sensor generates its own set of candidate objects based on the feature-location representations present in the input processor 410 for the corresponding sensor. For example, output processor 412A may generate a set of candidate objects based on the activated subset of cells in input processor 410A, and output processor 412B may generate another set of candidate objects based on the activated subset of cells in input processor 410B.

Cells in the output processor 412 may also be activated responsive to receiving lateral signals 480 from cells in the same output processor 412 or cells in other output processors 412 associated with the same object. The lateral signals 480 are received via lateral connections that are connections between a subset of cells in an output processor 412, and another subset of cells in the same output processor 412 or a different output processor 412 for transmitting lateral signals 480. A subset of cells in output processors 412 connected together by lateral connections may represent the same object. Thus, cells in an output processor 412 that represent objects common with those represented in other output processors 412 are reinforced through lateral connections. The set of lateral connections between subsets of cells in the same output processor 412 may be referred to as intra-lateral connections that carry intra-lateral inputs. The set of lateral connections between subsets of cells in different output processors 412 may be referred to as inter-lateral connections that carry inter-lateral inputs. In one embodiment, lateral connections between cells may be severed or generated during the learning process.

However, the lateral signals 480 shown in FIG. 4 are merely examples, and it is appreciated that there can be a variety of modifications to the configuration shown in FIG. 4. Each output processor 412 can provide and receive lateral signals 480 from one or more other output processors 412. For example, the output processor 412A can provide and receive lateral signals 480 to and from the output processor 412C as well as output processor 412B.

The output processor 412 provides the activation states of cells to cells in input processor 410 as feedback inputs 460. The feedback inputs 460 are provided via feedback connections that are connections between a subset of cells in the output processor 412 and a subset of cells in the input processor 410 for transmitting feedback inputs 460. Thus, similarly to feedforward connections, feedback connections represent an association between the object represented by the subset of cells in the output processor 412 and the feature-location representation represented by the subset of cells in the input processor 410. The subset of cells in the input processor 410 and the output processor 412 that have feedback connections may coincide with the subset of cells that have feedforward connections. In one embodiment, feedback connections between cells may be severed or generating during the learning process.

In one embodiment, connections between cells are learned by selecting and maintaining activation for a subset of cells in the output processors 412 for an object, and forming connections between cells in the input processor 410 and the output processor 412 based on sensory input data 110 at various locations on the object. Specifically, each output processor 412 selects a subset of cells for activation that correspond to a particular object. The activation states of cells in the output processors 412 are maintained. An activated cell in an output processor 412 selects a subset of activated cells in the same output processor 412 and forms intra-lateral connections with the selected subset of cells. The activated cell in the output processor 412 also selects a subset of activated cells in different output processors 412 and forms inter-lateral connections with the selected subset of cells.

In one embodiment, each lateral connection is associated with a permanence value indicating the frequency of that connection. In other words, the permanence value for a lateral connection indicates frequency of cell activations in the output processors 412 due to the activation of cells connected to the active cells through lateral connections. The permanence value may be adjusted through the learning process to sever existing lateral connections or generate new lateral connections.

Subsequently, the input processor 410 for a sensor receives sensory input data 110 at a given location on the particular object. Responsive to receiving sensory input data 110 and location information 120 including the location of the sensor on the object, the input processor 410 activates a subset of cells associated with the corresponding feature-location representation. Specifically, if the sensed feature-location representation is previously known, the cells in the input processor 410 associated with the feature-location representation may be activated. If the sensed feature-location representation was previously unknown, the inference system 104 selects a random cell in each column corresponding to the feature in the sensory input 110, and these cells are associated with the location included in the received location information 120. The selected cells are activated.

An activated cell in the input processor 410 selects a subset of cells in the corresponding output processor 412 and forms feedforward connections with the selected subset of cells. An activated cell in the output processor 412 selects a subset of cells in the corresponding input processor 410 and forms feedback connections with the selected subset of cells. This process is repeated when the sensor senses a new location on the object, leading to new sensory input data 110 and location information 120.

In one embodiment, each feedforward and feedback connection is associated with a permanence value indicating frequency of the connection. In other words, the permanence value for a feedforward connection indicates frequency of cell activations in the output processor 412 due to activation of cells in the input processor 410 connected to the active cells through feedforward connections. The permanence value for a feedback connection indicates frequency of cell activations in the output processor 412 due to the activation of cells in the input processor 410 connected to the active cells through feedback connections. The permanence value may be adjusted through the learning process to sever existing feedforward or feedback connections or generate new connections.

The learning process is completed for the particular object when, for example, each sensor has sensed sensory features on a set of allocentric locations on the object. When a new object is learned, the cells in the input processor 410 and the output processor 412 are deactivated, and the process described above is repeated for the new object.

Performing Inference Using the Inference System

Figure 5A:
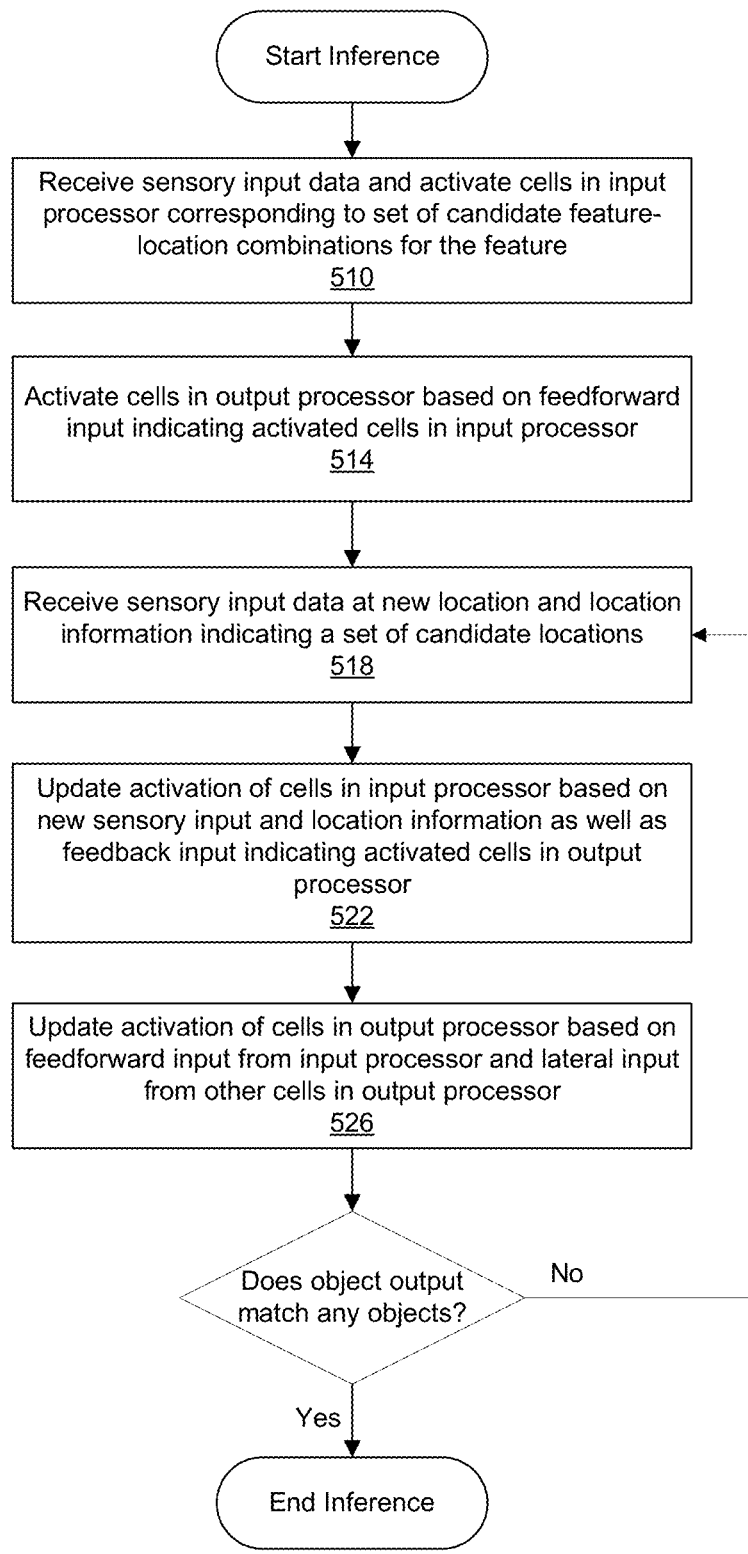
FIG. 5A is a flowchart illustrating a method of performing inference in the inference system, according to one embodiment.

FIG. 5A is a flowchart illustrating a method of performing inference in the inference system 104, according to one embodiment. The input processor 410 receives 510 sensory input data 110 for a corresponding sensor, and activates cells associated with the feature described in the sensory input data 110. Thus, the combination of activated cells in the input processor 410 represent the set of candidate feature-location representations associated with the particular feature. The input processor 410 generates and provides the activation states of the cells as feedforward signal 440 to cells in the output processor 412 that have feedforward connections with the activated cells in the input processor 410.

The output processor 412 activates 514 its cells based on the feedforward signal 440 indicating activation states of the cells in the input processor 410. Thus, the set of activated cells in the output processor 412 represents the set of candidate objects consistent with the candidate feature-location representations. The output processor 412 generates and provides the activation states of the cells as lateral signal 480 and feedback input 460. That is, the activation states of cells in one output processor 412 are provided to cells in the same output processor or other output processors 412 in the form of lateral inputs (including intra-lateral inputs and inter-lateral inputs), and are provided to cells in the input processor 410 in the form of feedback inputs.

The input processor 410 receives 518 sensory input data 110 at a new location due to, for example, movement of the sensor. The input processor 410 also receives location information 120 indicating a set of updated potential locations based on a determined location shift of the sensor from the previous location. The location information 120 may be received for example, from a controller 422 controlling movement of the sensors (e.g., on the robotic hand) through one or more actuators. In other examples, the location information 120 may be received from a separate encoder that determines the updated set of potential locations based on receiving location shifts information of the sensors.

The input processor 410 updates 522 activation of cells based on the new sensory input data 110 and location information 120, and also based on feedback input 460 indicating activation states of the cells in the output processor 412. Thus, the set of activated cells in the input processor 412 represent feature-location representations consistent with the updated sensory input data 110 and location information 120, as well as the set of candidate objects. The input processor 410 again provides the activation states of the cells as feedforward signal 440 to cells in the output processor 412.

The output processor 412 updates 526 activation of cells based on the new feedforward signal 440 indicating activation states of cells in the input processor 410, and lateral signal 480 indicating activation states of cells in the same or other output processor 412. Thus, the set of activated cells in the output processor 412 represent candidate objects consistent with the set of updated candidate feature-location representations, as well as candidate objects in other output processors 412. If the activated cells in the output processor 412 match a single object, than the inference is completed. Otherwise, the process is repeated to receive another sensory input data 110 at a new location.

In one embodiment, the output processor 412 determines that a subset of activated cells match an object if a predetermined threshold of activated cells in the output processor 412 are associated with a given object. For example, the output processor 412 may output a coffee cup object if 90% of the activated cells in the output processor 412 are associated with the coffee cup object. In one embodiment, if a single object cannot be identified, the output processor 412 may output the current list of candidate objects as the output.

The steps shown in FIG. 5A are merely illustrative. One or more of these steps may be used in conjunction, selective selected or discarded, and/or varied during operation of the inference process. For example, one or more of these steps may be performed in a parallel operations and not in a particular sequence.

Learning of Connections for Inference

Figure 5B:
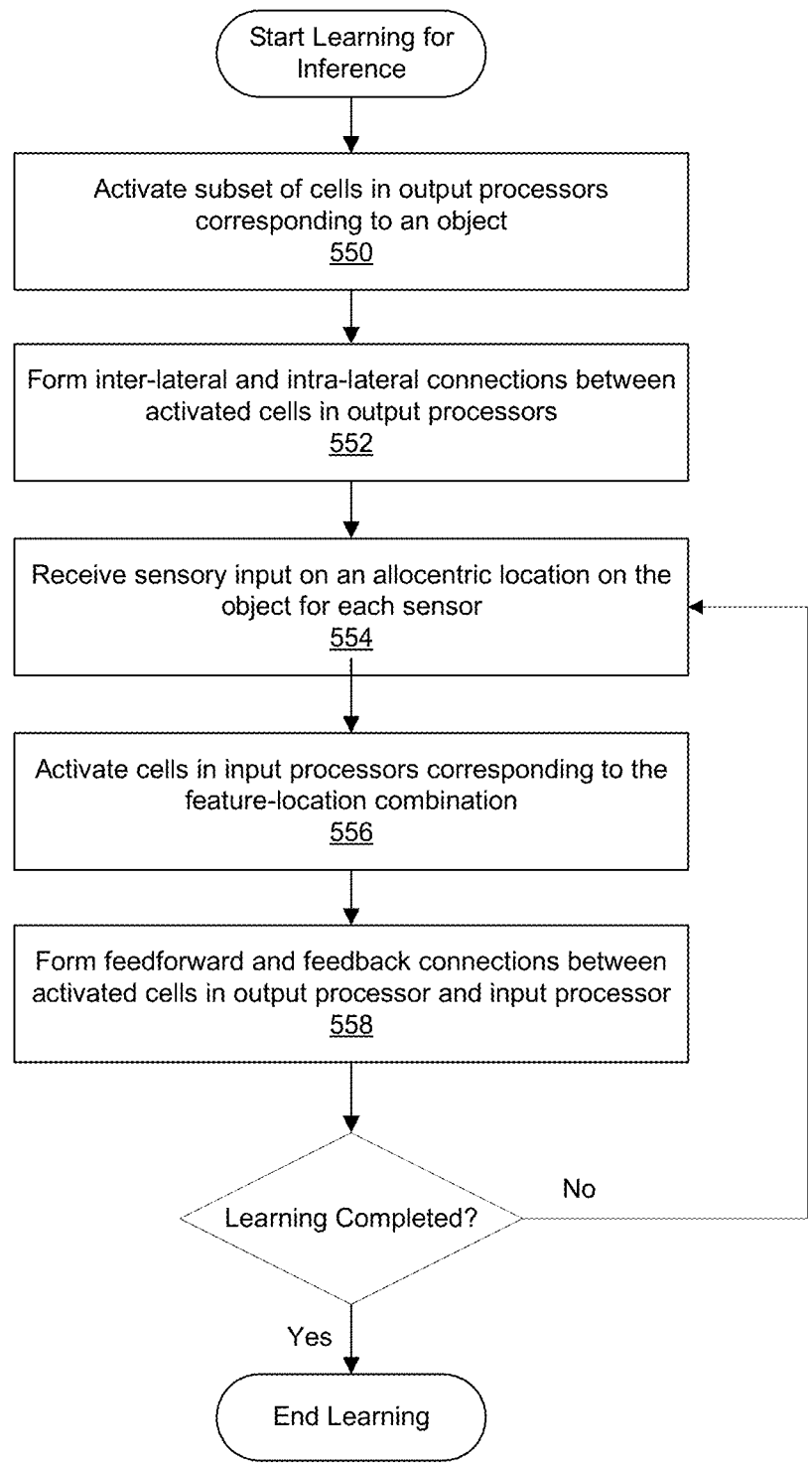
FIG. 5B is a flowchart illustrating a method of learning connections for inference, according to one embodiment.

FIG. 5B is a flowchart illustrating a method of learning connections for inference, according to one embodiment. A subset of cells in output processors 412 are selected to represent an object when the cells are activated 550. The combination of activated cells across one or more output processors 412, when activated, indicates that the object is detected.

Inter-lateral connections and intra-lateral connections are formed 552 between one or more activated cells of the output processors 412. Specifically, intra-lateral connections are connections between cells in different columns of the same output processor 412. Inter-lateral connections are connections between cells in output processors corresponding to different sensors.

The inference system 104 receives 554 sensory input data 110 associated with an allocentric location on the object. A subset of cells in the input processor 410 corresponding to the feature-location representation are activated 556. Feedforward and feedback connections are formed 558 between the activated cells of the output processor 412 and all or a subset of the activated cells of the input processor 410. If the learning process is not completed, the process repeats such that the sensors receive new sensory input data 110 on a new location on the object.

After completing learning for an object, learning for a new object can be performed by activating 550 a different subset of cells in output processors 412 to represent the new object when the cells are activated, and repeating subsequent processes as illustrated in FIG. 5B.

The steps shown in FIG. 5B are merely illustrative. One or more of these steps may be used in conjunction, selective selected or discarded, and/or varied during operation of the learning process. For example, one or more of these steps may be performed in a parallel operations and not in a particular sequence.

Example Architecture of Input Processor

Figure 6:
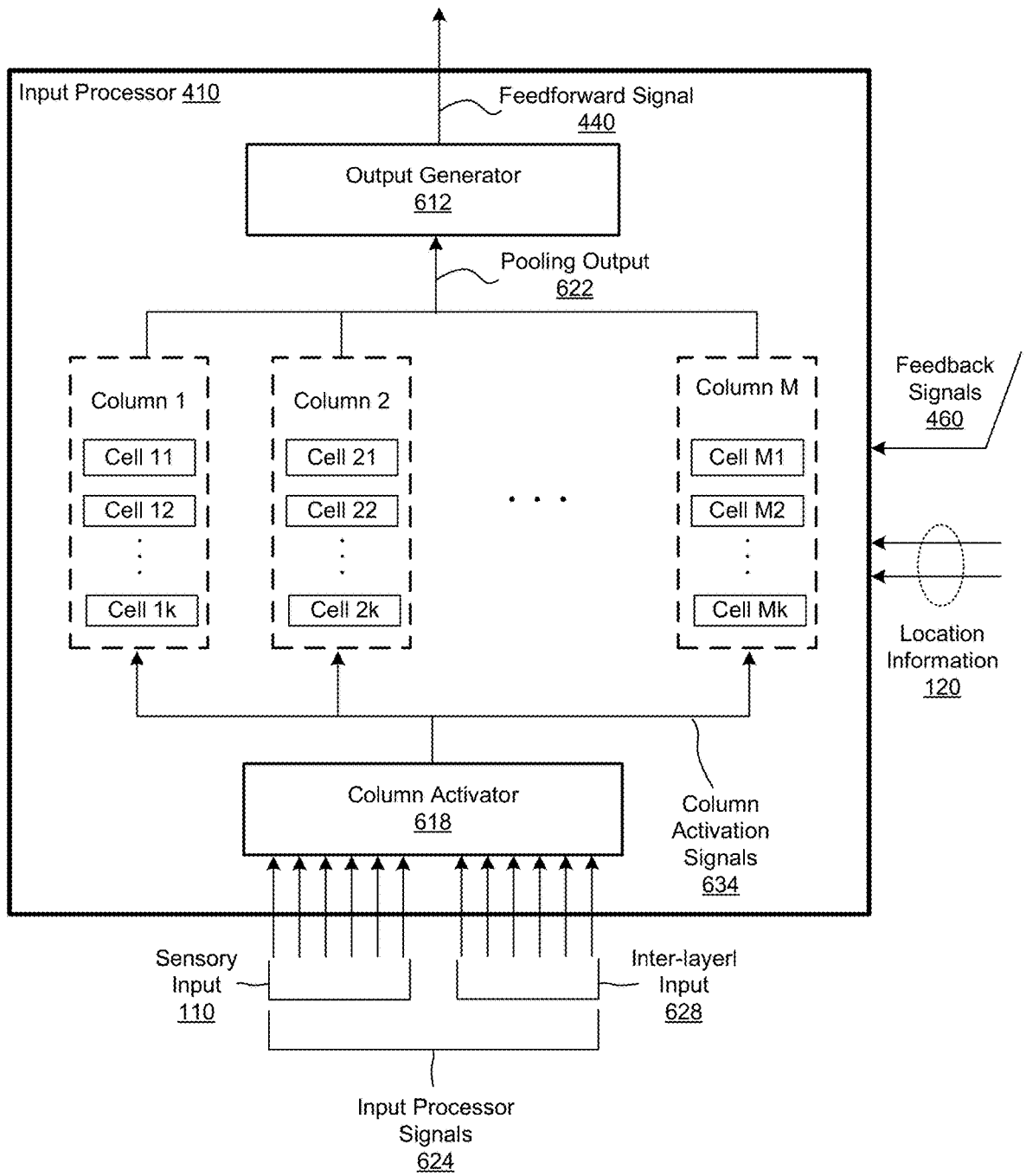
FIG. 6 is a detailed block diagram illustrating an input processor, according to one embodiment.

FIG. 6 is a detailed block diagram illustrating an input processor 410, according to one embodiment. Input processor 410 may include, among other components, an output generator 612, columns of cells 11 through Mk (in dashed boxes), and a column activator 618.

The column activator 618 is a software, hardware or a combination thereof that receives sensory input data 110 and generates column activation signals 634 indicating which columns of cells are to be activated based on the received sensory input data 110. One or more column activation signals 634 may represent presence of particular features in the sensory input data 110. As will be described in conjunction with FIG. 16, an input processor 410 can also receive inter-layer inputs 628 from other output processors and generates column activation signals 634 indicating which columns of cells are to be activated based on the received inter-layer inputs 628.

The input processor 410 also receives feedback signals 460 from the corresponding output processor. The feedback signals 460 are fed to a subset of cells in the input processor 410 with feedback connections to the cells that originate the feedback signals, and indicate potential activation of one or more cells in the input processor 410 that are associated with at least one candidate object in the set of candidate objects represented by cells in the output processor 412. The input processor 410 also receives location information 120. The location information 120 are fed to cells in the input processor 410 as location signals, and indicates the corresponding sensor may be at a known or potential location on the object associated with the cells.

In one embodiment, each column includes the same number (N) of cells. A cell in the input processor 410 has three states: inactive, predictive, and active. As described in more detail below with reference to FIG. 7, a cell may become activated (i.e., in an active state) if the cell receives a column activation signal 634 when it is previously in a predictive state. When a cell in a column becomes activated, the active cell inhibits activation of other cells in the same column except in certain limited circumstances. The predictive state represents a prediction that the cell will be activated by the column activation signal 634 at a next time step. A cell may become predictive (i.e., in a predictive state) in response to receiving location signals. A cell may also become predictive in response to receiving feedback signals from cells in the output processor through feedback connections. A cell that is in neither an active state nor a predictive state is referred to as inactive (i.e., in an inactive state).

In one embodiment, cells are activated if the cells are previously in a predictive state and receive column active signals 634 at a subsequent time step. For example, responsive to receiving location information 120, a subset of cells that receive location signals may become predictive. Predictive cells that receive column activation signals 634 generated based on the received sensory input data 110 are activated. In this manner, only the subset of cells in the input processor 410 that are consistent with the sensory input data 110 and the location information 120 are activated. As another example, cells that receive feedback signals may become predictive due to activation of cells in the corresponding output processor that provide feedback signals to the cells. Predictive cells that receive column activation signals 634 generated based on the sensory input data 110 are activated. In this manner, only the subset of cells in the input processor 410 that are consistent with the sensory input data 110 and the current set of candidate objects are activated. As yet another example, cells that receive both location signals and feedback signals may become predictive. In this instance, the subset of cells in the input processor 410 that are consistent with the sensory input data 110, location information 120, and the set of candidate objects are activated.

In one embodiment, if cells in a predictive state were predictively active due to feedback signals transmitted through feedback connections, and sensory input data 110 resulted in correct activation of the cell, the permanence values for feedback connections of the cells to activated cells in the output processor 412 are increased whereas the permanence values for connections to inactivated cells in the output processor 412 are decreased. On the other hand, if cells in the predictive state are not followed by activation of the cells, the permanence values for feedback connections to activated cells in the output processor 412 are decreased. If a permanence value for a connection drops below a threshold value, the connection may be severed. In this manner, feedback connections between cells with low permanence values no longer contribute to activation of cells in the input processor 410.

Continuing with the example, if no cell in the column is currently in a predictive state, one or more of the cells (e.g., all of the cells in the column) can be randomly selected and activated. When no cell in the column is currently in a predictive state, cells in the column may be activated based on recent activation states. Specifically, the cell most recently activated in the column may be selected for activation. Alternatively, all cells in the column may be activated if no cell in the column is currently in a predictive state.

In another embodiment, one or more cells in the column are activated even though other cells are in the predictive state in the same column.

The cells individually send pooling output 622 identifying the states of cells 11 through Mk to output generator 612. In one embodiment, the pooling output 622 indicates which cells are activated and/or which cells were predicted and became active. For example, the pooling output 622 of each cell may be represented as a binary value such as a two-bit binary value, with one bit indicating whether the cell is activated and one bit indicating whether the cell was predictive and became active. In some embodiments, the pooling output 622 indicates which cells are activated and which cells are predictive. For example, the pooling output 622 of each cell may be represented as a binary value such as a two-bit binary value, with one bit indicating whether the cell is activated and one bit indicating whether the cell is predictive. Although the pooling output 622 takes a binary value in most cases, the pooling output 622 may also be a non-binary value. For example, the pooling output 622 may include an integer or real-number value indicating the strength of the cell's activated state.

The output generator 412 is software, hardware, firmware or a combination thereof that generates feedforward signal 440 based on the activation of cells 11 through Mk. In one embodiment, output generator 412 collects the pooling outputs 622 from the cells or columns and concatenates these outputs into a vector. The concatenated vector may be sent as feedforward signal 440 of the input processor 410 to the output processor 412.

Example Diagram of Cell in Input Processor

Figure 7:
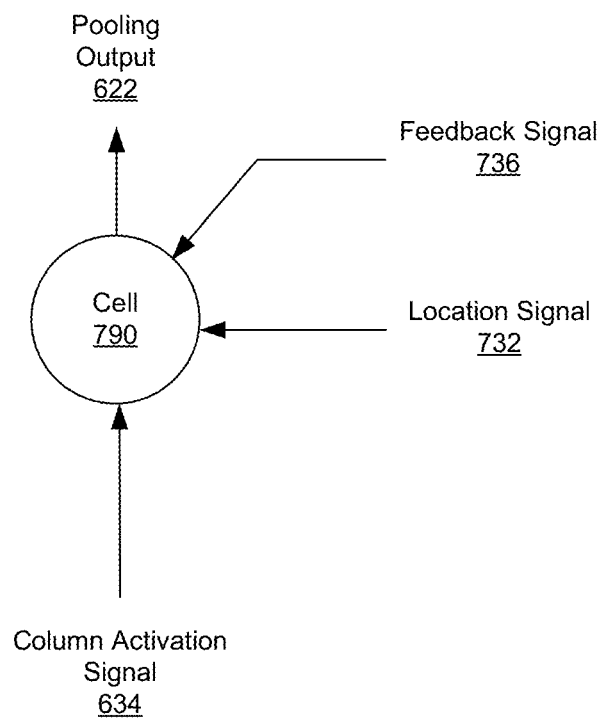
FIG. 7 is a conceptual diagram illustrating signals associated with a cell in the input processor, according to one embodiment.

FIG. 7 is a conceptual diagram illustrating signals associated with a cell 790 in the input processor 410, according to one embodiment. The cell 790 may be a physical or logical construct that takes one of inactive, predictive, and actives based on its previous state and various signals that it receives.

As discussed in reference to FIG. 6, cell 790 receives location signal 732 indicating that the corresponding sensor may be at a known location or a potential location on the object associated with the cell 790. Cell 790 also receives feedback signal 736 indicating activation of one or more cells in the corresponding output processor having feedback connections to the cell.

As discussed in reference to FIG. 6, cell 790 may become predictive when it receives location signal 732 and/or feedback signal 736. Cell 790 also receives column activation signal 634 that may cause activation of the cell 790.

In one embodiment, cell 790 becomes active when (i) cell 790 is in a predictive state, then transitions to an active state in response to the column activation signal 634, and/or (ii) cell 790 is not in a predictive state but is nonetheless activated in response to the column activation signal 634. For example, if the column containing cell 790 receives a column activation signal 634 but no cells in the column are in a predictive state, all cells in the column including cell 790 may be activated.

Example Operation and Function of Cells in Input Processor

Figure 8A:
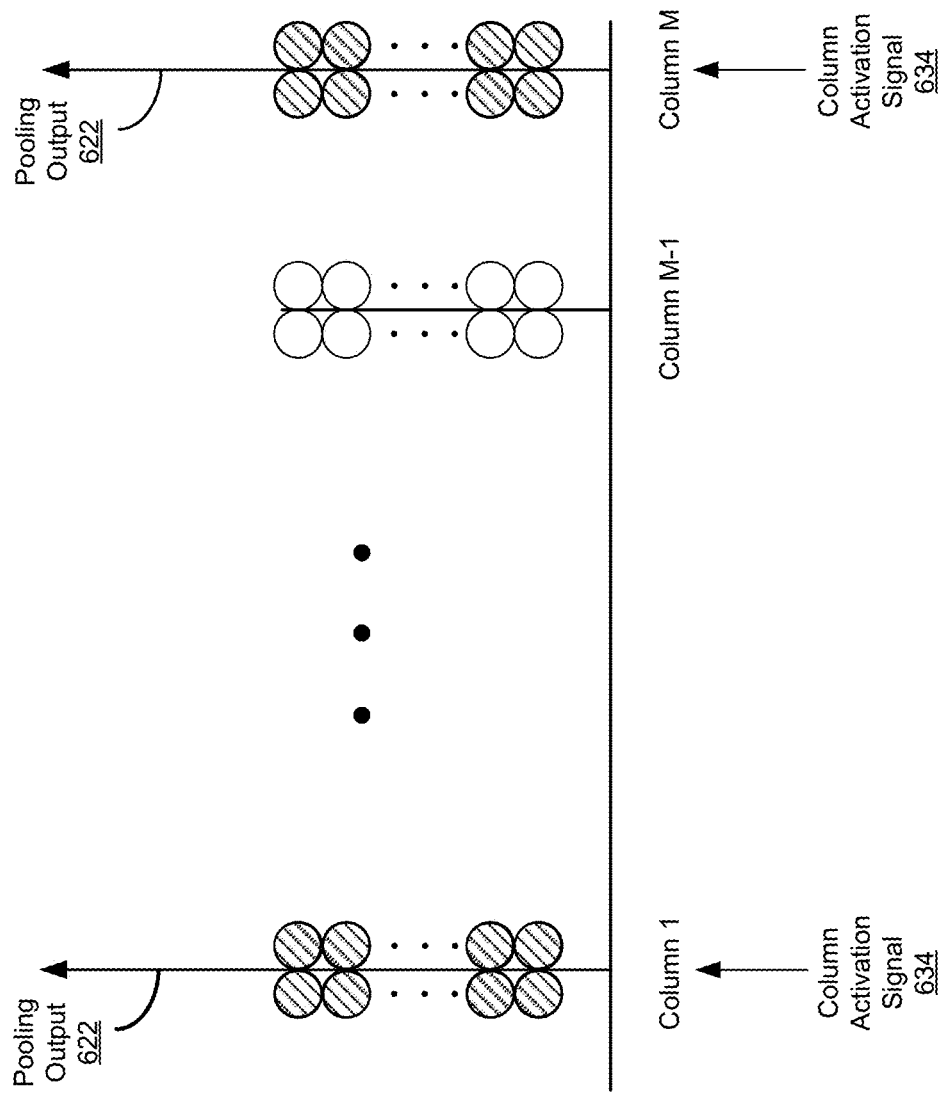
FIGS. 8A through 8C are diagrams illustrating example activation states of cells in the input processor, according to one embodiment.
Figure 8B:
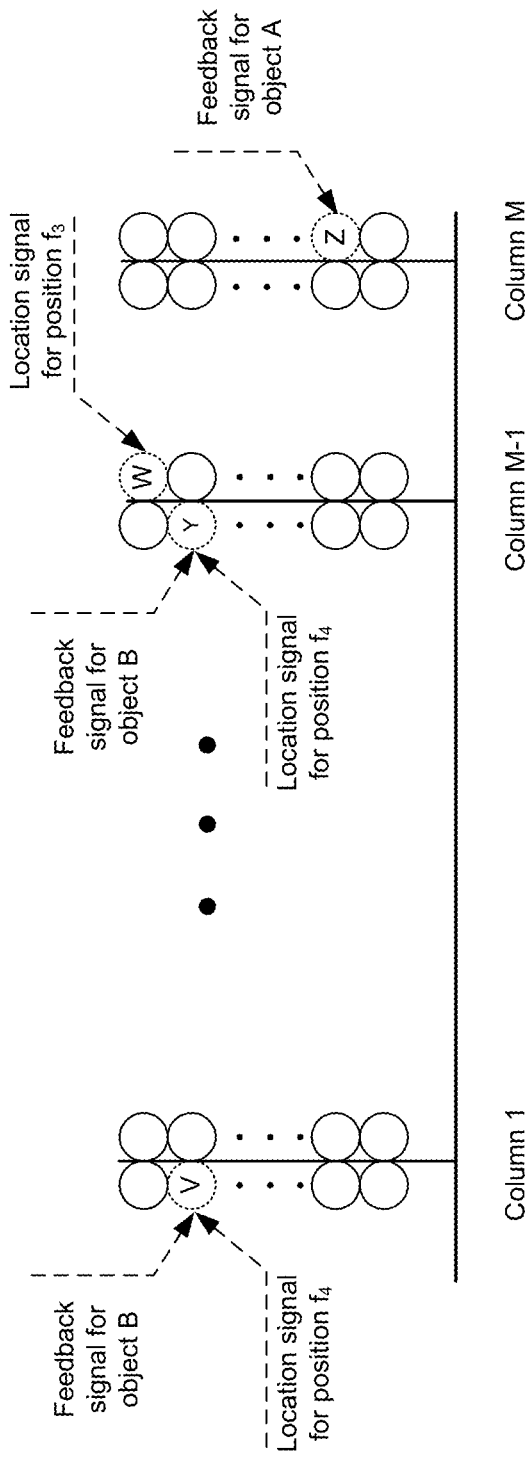
Figure 8C:
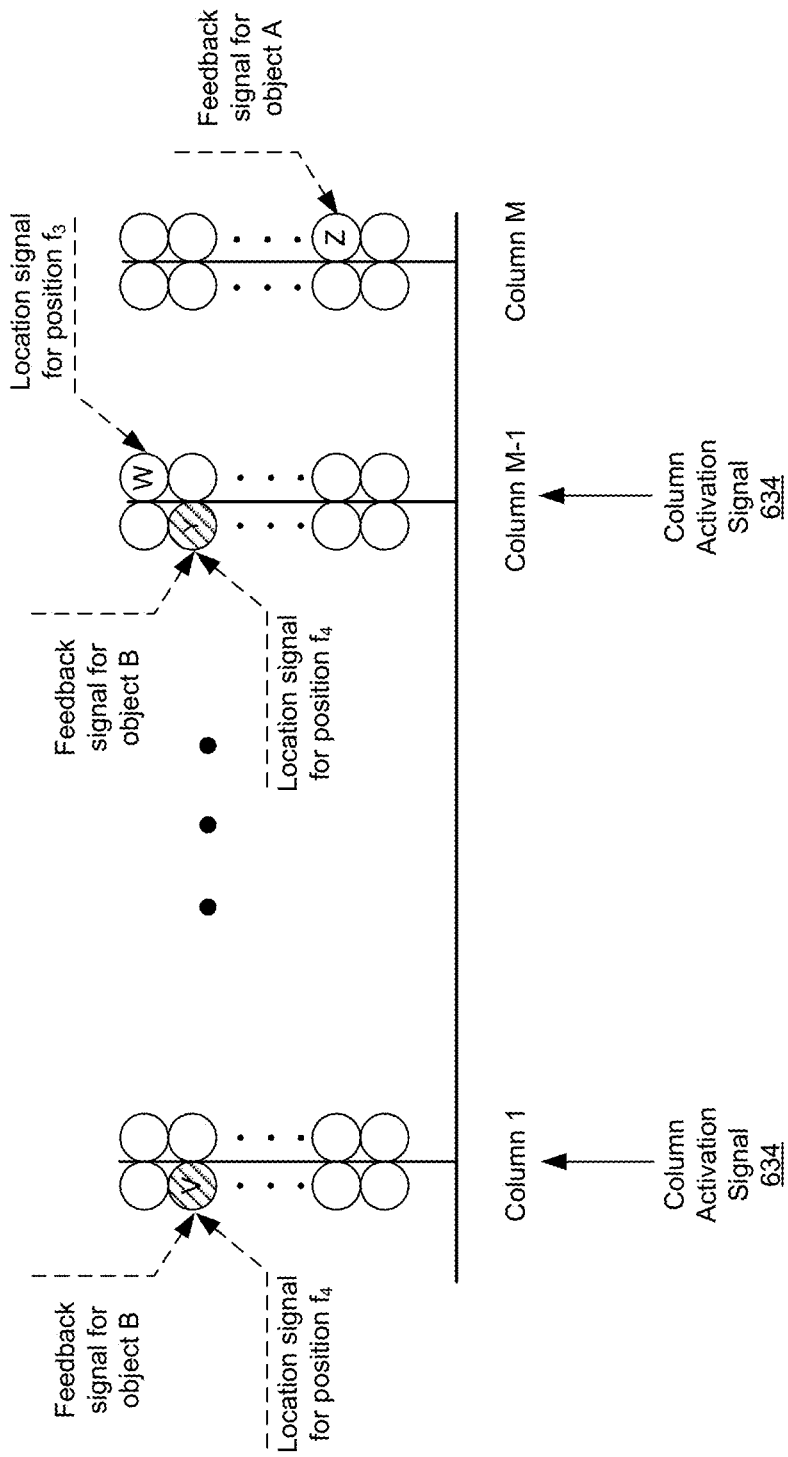

FIGS. 8A through 8C are diagrams illustrating example activation states of cells in the input processor 410 associated with learning and recognizing different objects including object A and object B, according to one embodiment. Each circle in represents a cell in the input processor 410. When each cell becomes active, the cell sends out pooling output 622.

FIG. 8A illustrates the input processor 410 receiving sensory input data 110 at an initial state without a previous training. Based on the received sensory input data 110, column activation signals 634 corresponding to column 1 and column M of the input processor 410 are generated. Since initially no cells are in a predictive state, all cells in column 1 and column M are activated as a result of receiving the column activation signals 634. The activation states of the cells are represented in pooling output 622 generated by the columns of cells.

The activated cells in the input processor 410 then cause activation of cells in the output processor 412 associated with candidate objects A and B having feedforward connections to the activated cells in the input processor 410. The activation of cells in the output processor 412 then provides feedback signal described with reference to FIG. 8B.

FIG. 8B shows the operation of cells in the input processor 410 in the next time step, according to one embodiment. As illustrated in FIG. 8B, cells V, Y, and Z are connected to the activated cells in the output processor 412, and hence, receive feedback signals 736 from cells in the output processor 412 associated with candidate objects A and B that are represented by activation of cells in the output processor 412. The feedback signal 736 places cells V, Y, and Z in a predictive state. Cells V, Y and W of the input processor 410 also receive location information 120 indicating a set of potential locations $f_3$ and $f_4$. The potential locations $f_3$ and $f_4$ are generated based on an estimated location shift between the location of the sensors when generating the sensory input data 110 for FIG. 8A and the current location of the sensors. Cells V, Y, and W receive location signals 732 since they are associated with these locations. Cells V, Y, and Z maintain their predictive state, and cell W also becomes predictive.

As shown in FIG. 8C, the input processor 410 receives new sensory input data 110. Based on the new sensory input data 110, the column activator 618 generates column activation signals 634 corresponding to column 1 and column M of the input processor 410. Since cell V was previously in a predictive state, cell V is selected for activation. Although both cells W and Y were in a predictive state, only cell Y is selected for activation due to inhibition of cell W by cell Y because cell Y received both feedback and location signals, while cell W only received a location signal. Various activation and inhibition rules will be described in more detail with reference to FIG. 10 below.

Functional Block Diagram of Cell in Input Processor

Figure 9:
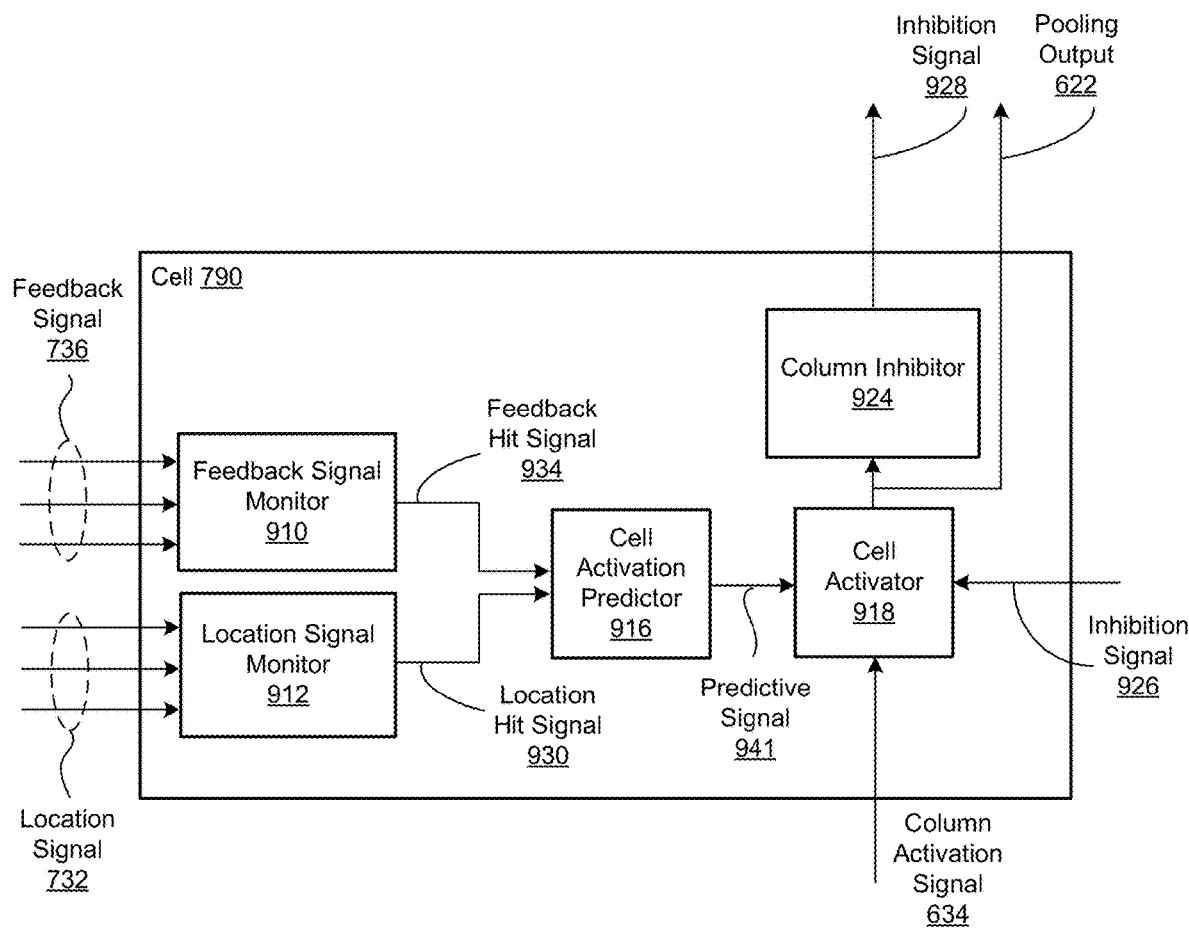
FIG. 9 is a functional block diagram illustrating a cell in the input processor of FIG. 7, according to one embodiment.

FIG. 9 is a functional block diagram illustrating cell 790, according to one embodiment. Cell 790 may include, among other components, a feedback signal monitor 910, a location signal monitor 912, a cell activation predictor 916, a cell activator 918, and a column inhibitor 924. One or more of these components may be embodied in software, firmware, hardware or a combination thereof. Further, cell 790 may include other components not illustrated in FIG. 9.

The feedback signal monitor 910 is software, firmware, hardware or a combination thereof for monitoring activation states of cells in a corresponding output processor 412. For this purpose, the feedback signal monitor 910 receives the feedback signal 736 from cells in the output processor 412 connected to the cell 790. If the feedback signal 736 indicates that one or more cells having feedback connections to the cell 790 are active, feedback signal monitor 910 sends feedback hit signal 934 to cell activation predictor 916.

The location signal monitor 912 is software, firmware, hardware or a combination thereof for receiving the location signal 732. If the location signal 732 indicates that the locations on the object associated with the cell 790, the location signal monitor 912 sends location hit signal 930 to cell activation predictor 916.

The cell activation predictor 916 is software, firmware, hardware or a combination thereof that places the cell in a predictive state based on location hit signal 930 and/or feedback hit signal 934. In one embodiment, if at least one of the location hit signal 930 and the feedback hit signal 934 are generated, the cell activation predictor 916 places the cell 790 in a predictive state, and sends predictive signal 941 indicating that the cell 790 is in a predictive state to the cell activator 918.

The cell activator 918 is software, firmware, hardware or a combination thereof that determines whether to place the cell 790 in an activated state according to a set of activation and inhibition rules. For this purpose, the cell activator 918 receives column activation signal 634, predictive signal 941, and inhibition signal 926.

One additional condition for cell activation may be that there be no inhibition signals 926 from other cells in the same column or in a different column. If inhibition signal 926 is received from other cells, cell 790 is not activated despite column activation signal 634. If the cell 790 is placed in an activated state, the cell activator 918 generates pooling output 622 indicating whether the cell is active, or was predictive and became active. In one embodiment, pooling output 622 is generated regardless of the reasons cell 790 is activated. Various activation and inhibition rules are described in further detail in reference to FIG. 10 below.

In response to activation of the cell 790 by the cell activator 918, column inhibitor 924 generates inhibition signal 928. Inhibition signals 928 are sent to other cells in the same column or in a different column to inhibit activation of the other cells in the same input processor 410.

Example Activation Rules of Cell in Input Processor

Figure 10:
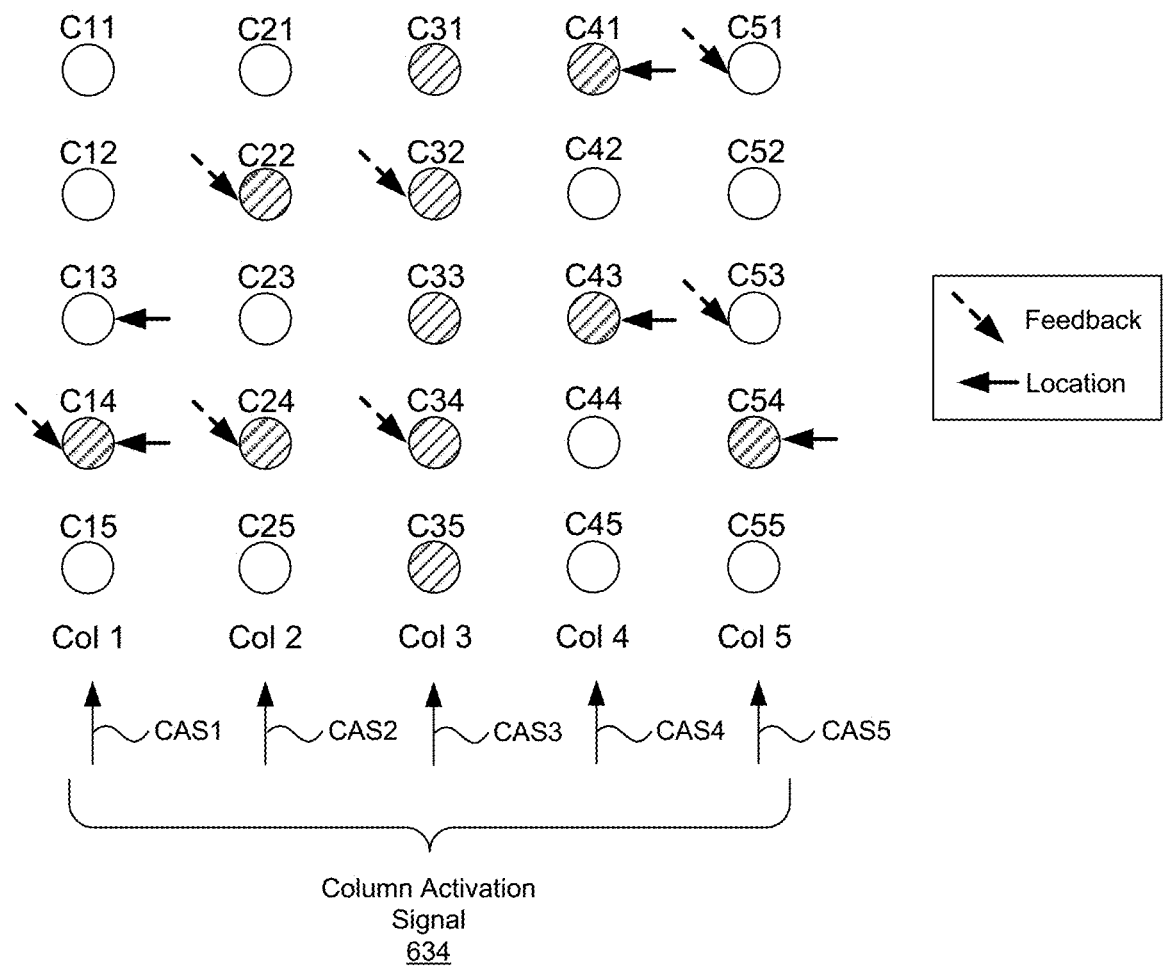
FIG. 10 is a diagram illustrating activating cells or inhibiting activation of cells in the input processor based on various rules, according to embodiments.

FIG. 10 is a diagram illustrating activating cells or inhibiting activation of cells in the input processor 410 based on various rules, according to embodiments. In the example of FIG. 10, some of the cells generate feedback hit signal 934 and/or location hit signal 930. The cells are arranged in columns (columns 1 through 5) and some columns receive column activation signal CAS whereas some columns do not. "Feedback" arrows (dotted) indicate that the cell has generated feedback hit signal 934, and "Location" arrows (solid) indicate that the cell has generated location hit signal 930. As discussed above in detail with reference to FIGS. 6 through 8, if a column of cells receive column activation signal 634, but does not contain any predictive cells, all of the cells or a subset of the cells in the column become active. The rules associated with the operations of cells described below with reference to FIG. 10 are merely for illustration. One or more of these rules may be used in conjunction, selective selected or discarded, and/or varied during operation of the processing nodes.

One of the rules is to have cells that generate both location hit signal 930 and feedback hit signal 934 inhibit activation of cells that only generate location hit signal 930 in the same column. As shown in column 1 of FIG. 10, cell 13 generates location hit signal 930 and cell C14 generates both location hit signal 930 and feedback hit signal 934. After receiving column activation signal CAS1, only cell C14 is activated whereas cell C12 is not activated because cell C14 (generating both the location hit signal 930 and the feedback hit signal 934) inhibit the activation of cell C13 (generating only location hit signal 930).

Another rule is if there are cells that only generate feedback hit signal 934, these cells are activated after receiving a column activation signal 634. As shown in column 2, cells C22 and C24 generate feedback hit signals 934. After receiving column activation signal CAS2, cells C22 and C24 are both activated.

Alternatively, another rule is to activate all cells in a column upon receiving the column activation signal 634 if there are no cells that generate location hit signal 930. As shown in column 3, although cells C32 and C34 generate feedback hit signal 934, all cells in the column are activated after receiving the column activation signal CAS3 because there is no cell in column 3 that generates location hit signal 930.

Another rule is if there are cells that only generate location hit signal 930, these cells are activated after receiving a column activation signal 634. As shown in column 4, cells C41 and C43 generate location hit signals 930. After receiving column activation signal CAS4, cells C41 and C43 are both activated.

Another rule is to have cells that generate only location hit signal 930 inhibit activation of cells that only generate feedback hit signal 934 in the same column. As shown in column 5, cells C51 and C53 generate feedback hit signal 934. Cell 54 generates location hit signal 930. After receiving column activation signal CAS5, only cell 54 is activated whereas cells C51 and C53 are not activated because cell C54 (generating only the location hit signal 930) inhibits the activation of cells C51 and C53 (generating only the feedback hit signal 934).

Another rule is to require cells generating both location hit signal 930 and feedback hit signal 934 to be activated. In other words, cells generating only location hit signal 930 or only feedback hit signal 934 are not activated even though they may be in a predictively active state.

The rules illustrated in conjunction with FIG. 10 are merely examples, and those of skill in the art will appreciate other activation and inhibition rules for the inference system 104.

Example Architecture of Output Processor

Figure 11:
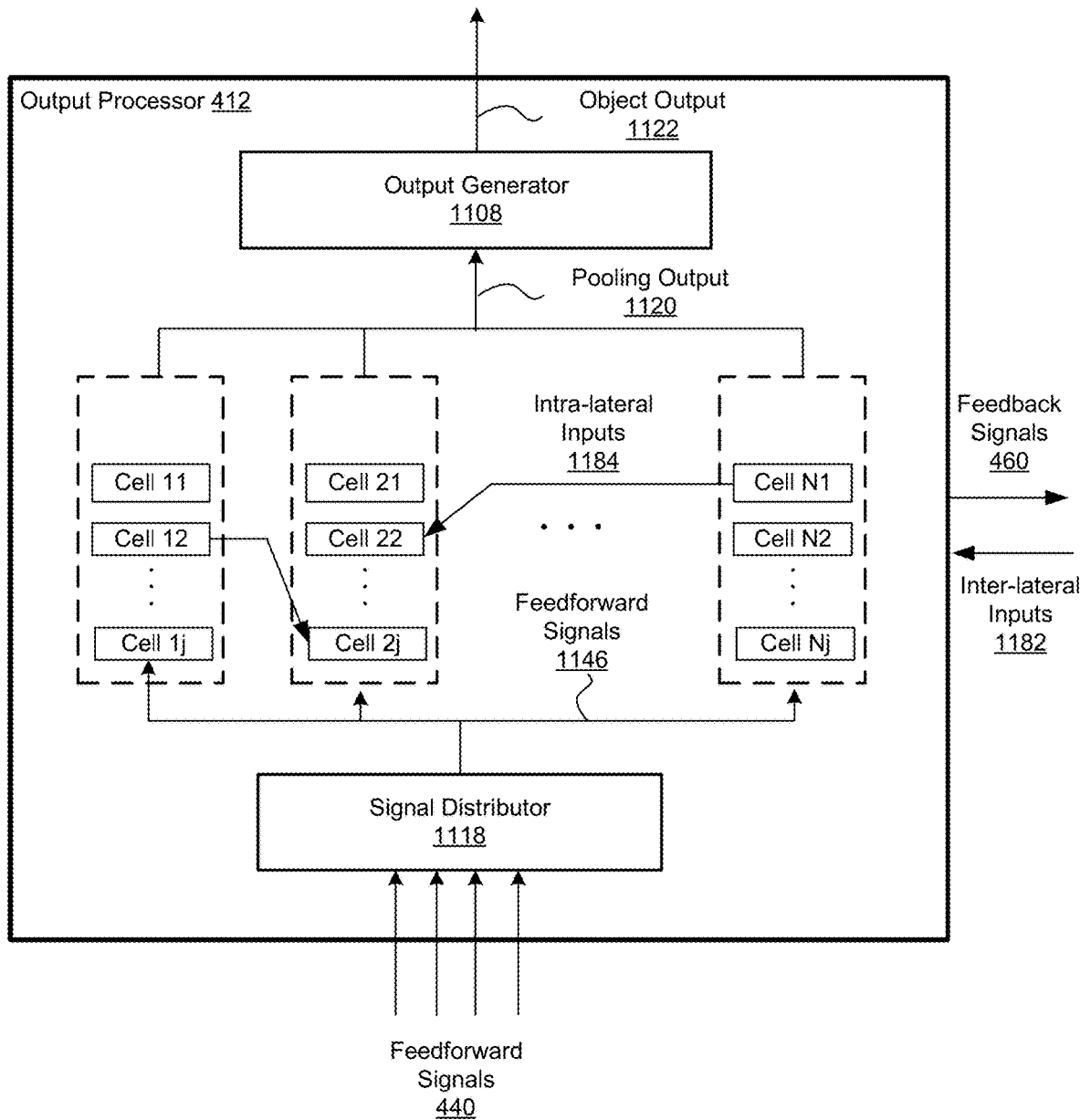
FIG. 11 is a detailed block diagram illustrating an output processor, according to one embodiment.

FIG. 11 is a detailed block diagram illustrating an output processor 412, according to one embodiment. Output processor 412 may include, among other components, an output generator 1108, a set of cells 11 through Nj (in dashed boxes), and a signal distributor 1118. As described previously in conjunction with FIG. 4, in one embodiment, the cells of the output processor 412 may optionally be arranged in columns. In such an embodiment, there may be a single cell in each column. The output processor 412 receives feedforward signals 440 indicating activation states of cells in the input processor 410. The feedforward signals 440 may represent presence of particular feature-location representations in the input processor 410. The feedforward signals 440 are fed to appropriate cells in the output processor 412 through feedforward signals 1146.

The output processor 412 also receives inter-lateral inputs 1182 from cells in other output processors. The inter-lateral input described herein refers to a signal received at a cell in an output processor from cells in other output processors connected to the cell. The inter-lateral inputs 1182 are fed to cells in the output processor 412 through inter-lateral connections. An inter-lateral signal to cells in the output processor 412 indicates activation of one or more cells in other output processors associated with the same object as the cells. One or more cells in the output processor 412 also receive intra-lateral inputs 1184 from other cells in the same output processor 412. The intra-lateral inputs 1184 are fed to cells in the output processor 412 through intra-lateral signals. The intra-lateral input described herein refers to a signal received at a receiving cell in an output processor from a sending cell in the same output processor. The inter-lateral input and the intra-lateral input collectively form lateral inputs. In one embodiment, a single cell may receive multiple lateral signals from cells in the same output processor 412 or in other output processors.

The output processor 412 also generates feedback signals 460 indicating activation states of cells in the output processor 412. As described above with reference to FIG. 6, the feedback signals 460 are fed to the corresponding input processor 410.

Similarly to cells in the input processor 410, a cell in the output processor 412 has three states: inactive, predictive, and active. A cell may become activated (i.e., in an active state) if the cell receives feedforward signal 1146. When a cell in the output processor 412 becomes activated, the active cell may inhibit activation of a subset of cells in the output processor 412 that are within a predetermined distance from the activated cell. In another embodiment, when cells of the output processor 412 are arranged in columns, the active cell may inhibit activation of other cells in the same column as the activated cell except in certain limited circumstances. In one embodiment, once a cell in the output processor 412 is activated, the cell maintains its active state for a predetermined length of time. The predictive state represents a prediction that the cell will be activated by a feedforward signal 1146. A cell may become predictive (i.e., placed in a predictive state) in response to receiving inter-lateral signals and/or intra-lateral signals. In one embodiment, once a cell in the output processor 412 is predictively activated, the cell maintains its predictive state for a predetermined length of time. A cell that is in neither an active state nor a predictive state is referred to as inactive (i.e., in an inactive state).

In one embodiment, cells in a predictive state become active after receiving feedforward signals. For example, responsive to receiving inter-lateral inputs 1182 and intra-lateral inputs 1184, cells that receive one or more lateral signals may become predictive. Predictive cells that receive feedforward signals may be activated. In this manner, the subset of cells in the output processor 412 that are consistent with the observed feature-location representations in the input processor 410 and candidate objects in other output processors are activated. In general, cells in output processors associated with the object being detected are more likely to be predictively activated through lateral connections to other cells associated with the object. Over time, these cells are in turn activated responsive to receiving feedforward signals 440 indicating presence of feature-location representations associated with the object. Thus, the subset of cells associated with the object will remain active after iterating through the process of updating activation states of cells in the input processor 410 and the output processor 412.

In one embodiment, if cells in a predictive state were predictively active due to lateral signals transmitted through lateral signals, and feedforward signal resulted in correct activation of the cell, the permanence values for lateral connections to activated cells in output processors 412 are increased whereas the permanence values for connections to inactivated cells in output processors 412 are decreased. On the other hand, if cells in the predictive state are not followed by activation of the cells, the permanence values for lateral connections to activated cells in output processors 412 are decreased. If a permanence value for a connection drops below a threshold value, the connection may be severed. In this manner, connections between cells in output processors 412 with low permanence values no longer contribute to activation of cells.

Continuing with the example, if no cell in the column is currently in a predictive state, cells receiving feedforward signals 1146 are activated. For example, if no cell in the column is currently in a predictive state, all cells in the column may be activated.

The cells individually, or collectively as a column, send pooling output 1120 to output generator 1108. The pooling output 1120 identifies the state of the cells. In one embodiment, the pooling output 1120 indicates which cells are activated and/or which cells were predicted and became active. For example, the pooling output 1120 of each cell may be represented as a binary value such as a two-bit binary value, with one bit indicating whether the cell is activated and one bit indicating whether the cell was pre-dictive and became active. In some embodiments, the pooling output 1120 indicates which cells are activated and which cells are predictive. For example, the pooling output 1120 of each cell may be represented as a binary value such as a two-bit binary value, with one bit indicating whether the cell is activated and one bit indicating whether the cell is predictive. Although the pooling output 1120 takes a binary value in most cases, the pooling output 1120 may also be a non-binary value. For example, the pooling output 1120 may include an integer or real-number value indicating the strength of the cell's cell activated state or active after being predictive state.

In one embodiment, output generator 1108 collects the pooling outputs 1120 from the cells and concatenates these outputs into a vector. The output generator 1108 generates the concatenated vector as the object output 1122. The inference system 104 determines whether the set of activated cells indicated in the object output 1122 match known object representations, and generates the set of candidate objects.

Example Diagram of Cell in Output Processor

Figure 12:
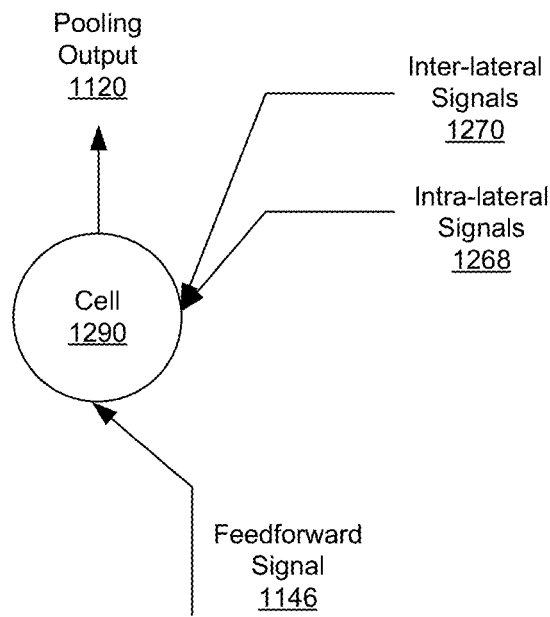
FIG. 12 is a conceptual diagram illustrating signals associated with a cell in the output processor, according to one embodiment.

FIG. 12 is a conceptual diagram illustrating signals associated with a cell 1290 in the output processor 412, according to one embodiment. As discussed in reference to FIG. 11, cell 1290 receives inter-lateral signals 1270 indicating activation of cells in other output processors 412. Cell 1290 also receives intra-lateral signals 1268 from other cells in the same output processor 412. The cell 1290 may receive lateral signals from one or more cells in the output processor 412. As discussed in reference to FIG. 11, cell 1290 may become predictive when it receives inter-lateral signal 1270 and/or intra-lateral signal 1268. Cell 1290 also receives feedforward signal 1146 indicating activation of cells in the input processor 410 with feedforward connections to the cell 1290.

In one embodiment, cell 1290 is activated when (i) cell 1290 is in a predictive state and receives feedforward signals 114, and/or (ii) cell 1290 is not in a predictive state but is nonetheless selected for activation in response to feedforward signals 1146. Responsive to being activated, cell 1290 may provide feedback signals 460 indicating its activation state to cells in the input processor 410 with feedback connections to the cell 1290.

As described above in reference to FIG. 11, when the cell 1290 becomes active or predictively active, the activation state of the cell 1290 may persist for a predetermined amount of time.

Example Operation and Function of Cells in Output Processor

Figure 13A:
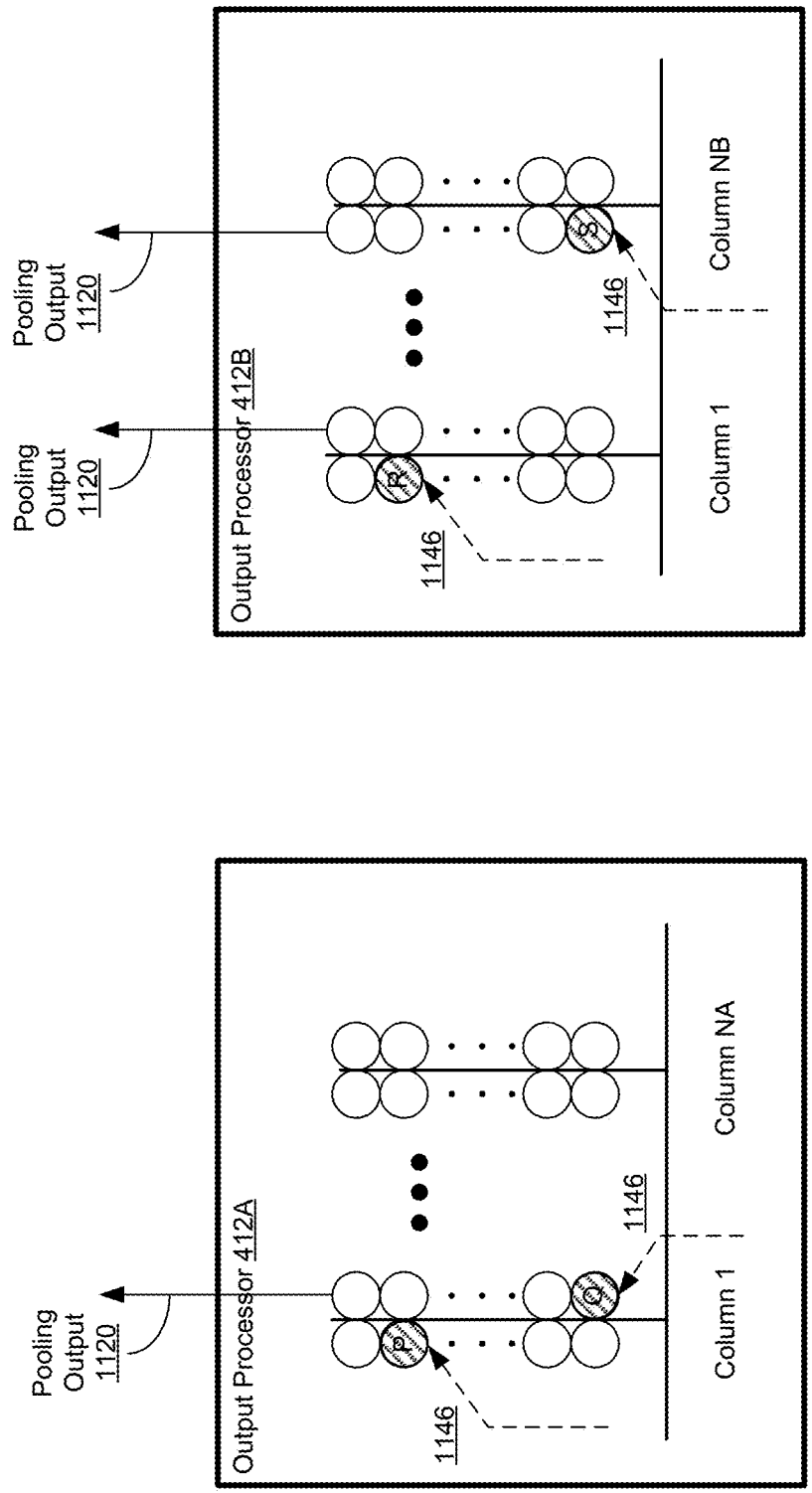
FIGS. 13A through 13C are diagrams illustrating example activation states of cells in the output processors, according to one embodiment.
Figure 13B:
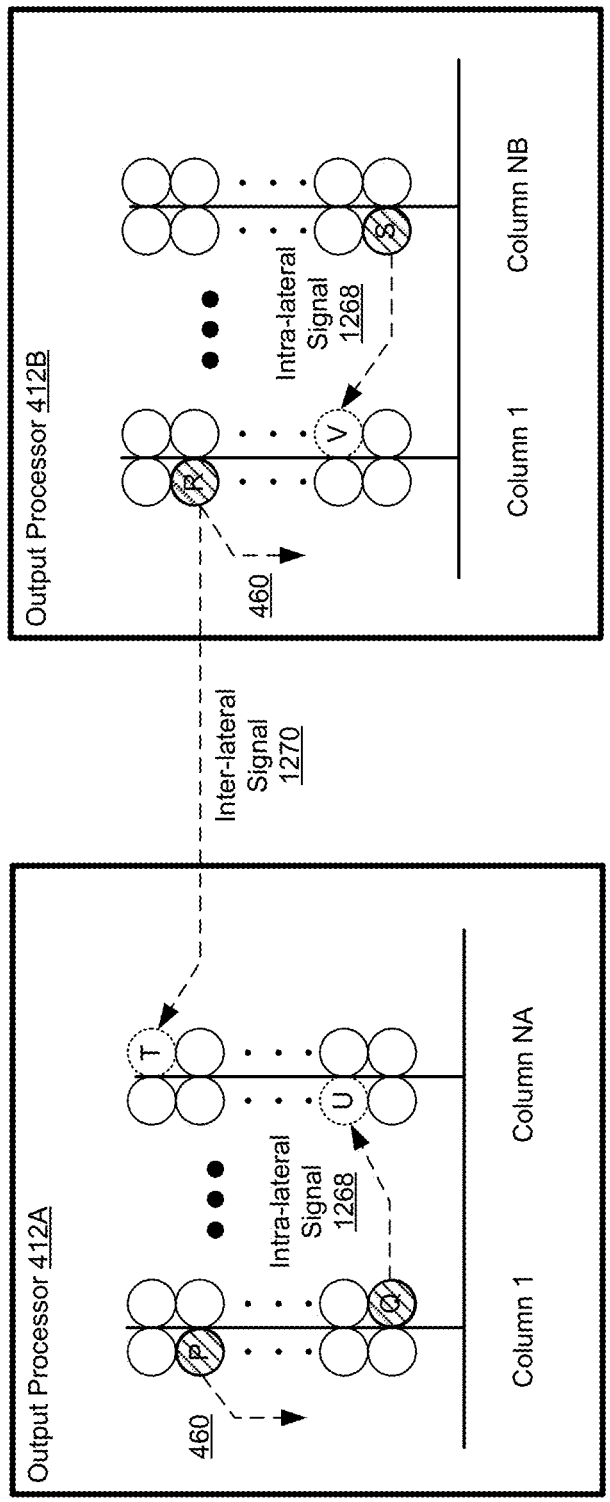
Figure 13C:
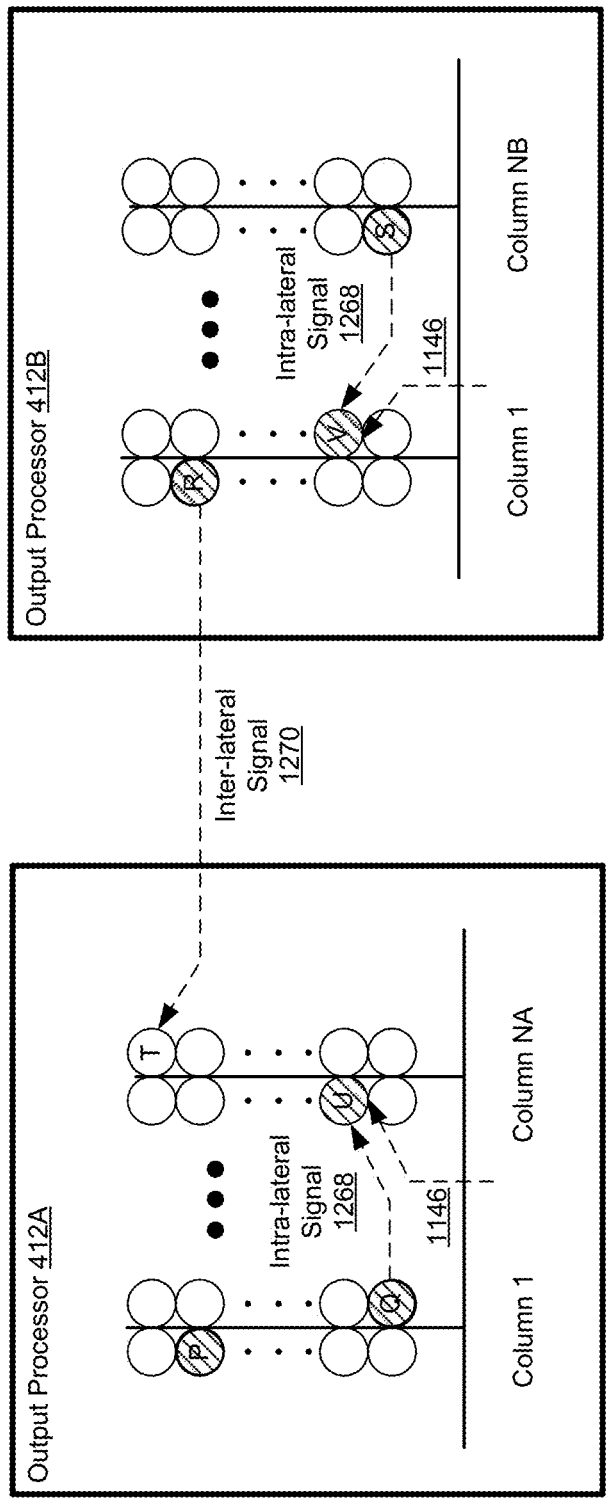

FIGS. 13A through 13C are diagrams illustrating example activation states of cells in the output processor 412A and an output processor 412B, according to one embodiment. Each circle represents a cell in the output processor. When each cell becomes active, the cell sends out pooling output 1120.

In FIG. 13A, no cells are in a predictive state, and the output processors 412A, 412B initially receive feedforward signal 440. Cells P, Q, R, and S receive feedforward signals 1146 since they have feedforward connections to activated cells in the corresponding input processors 410A, 410B. Cells P, Q, R, and S are activated since no other cell is in a predictive state. Thus, the subset of activated cells represents the set of candidate objects that are consistent with the activated feature-location representations in the input processors 410A, 410B. The activation states of the cells are generated as pooling output 1120.

As shown in FIG. 13B, at the next time step, cell T of output processor 412A receives inter-lateral signal 1270 from cell R of output processor 412B and becomes predictive. Cell U in output processor 412A receives intra-lateral signal 1268 from cell Q of output processor 412A and becomes predictive. Similarly, cell V or output processor 412B receives intra-lateral signal 1268 from cell S of output processor 412B and becomes predictive. In addition, activated cells P and R generate feedback signal 460 that are provided to cells in the input processor 410 with feedback connections to these cells.

As shown in FIG. 13C, at the next time step, the input processor 410 receives new sensory input data 110 and location information 120, and the output processors 412 receive updated feedforward signal 440 indicating another subset of activated cells in the input processor 410. Previously activated cells P, Q, R, and S still remain active at the current time step. Cells U and V receive feedforward signals 1146 based on the new feedforward signals 440. Cells U and V are both activated since they were previously in a predictive state and received feedforward signals 1146. Although cell T was in a predictive state, only cell U is selected for activation due to inhibition of cell T by cell U. This is because cell U received both feedforward signal 1146 and intra-lateral signal 1268, while cell T only received inter-lateral signal 1270.

Over time, the subset of cells associated with the detected object will remain active as the activation states of the cells in the input processor 410 and the output processor 412 are iteratively updated.

Functional Block Diagram of Cell in Output Processor

Figure 14:
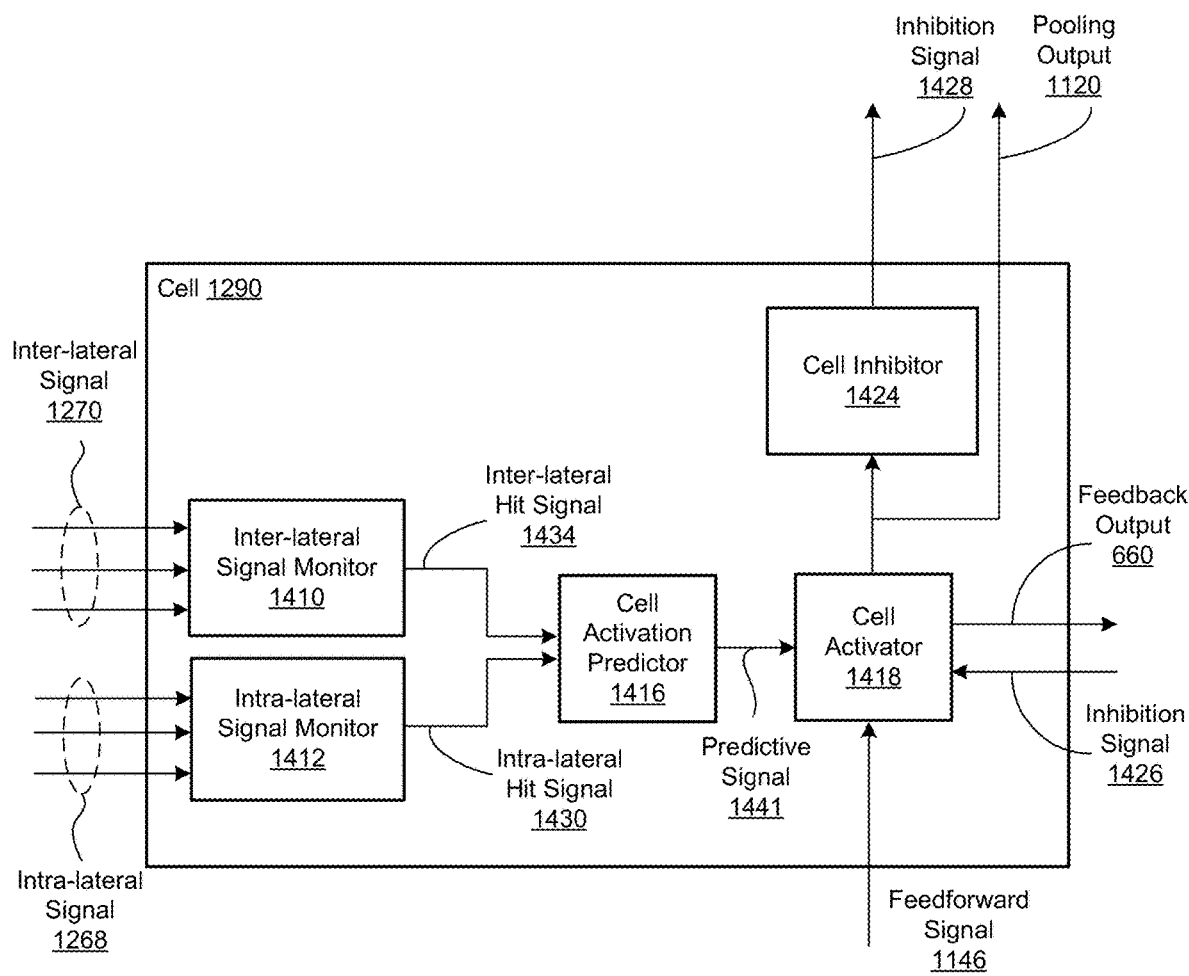
FIG. 14 is a functional block diagram illustrating a cell of the output processor, according to one embodiment.

FIG. 14 is a functional block diagram illustrating cell 1290, according to one embodiment. Cell 1290 may include, among other components, an inter-lateral signal monitor 1410, an intra-lateral signal monitor 1412, a cell activation predictor 1416, a cell activator 1418, and a column inhibitor 1424. The inter-lateral signal monitor 1410 is software, firmware, hardware or a combination thereof for receiving inter-lateral signals 1270 from other cells in output processors 412. The intra-lateral signal monitor 1412 is software, firmware, hardware or a combination thereof for receiving intra-lateral signals 1268 from other cells in the output processor 412. The feedforward signal monitor 1414 is software, firmware, hardware or a combination thereof for receiving feedforward signals 1146 from cells in the input processor 410.

If the inter-lateral signal 1270 indicates that cells in other output processors with lateral connections to the cell 1290 are active, the inter-lateral signal monitor 1410 sends inter-lateral hit signal 1434 to cell activation predictor 1416. If the intra-lateral signal 1268 indicates that other cells in the output processor 412 with lateral connections to the cell 1290 are active, the intra-lateral signal monitor 1412 sends intra-lateral hit signal 1430 to cell activation predictor 1416. The inter-lateral hit signal 1434 and intra-lateral hit signal 1430 indicate that the cell 1290 is in a predictive state. The cell activation predictor 1416 receives inter-lateral hit signal 1434 and/or intra-lateral hit signal 1430. The cell activation predictor 1416 sends indications of the cell's previous predictive states to the cell activator 1418 as predictive signal 1441. For example, the cell activation predictor 1416 indicates to the cell activator 1418 whether the cell 1290 was in a predictive state during a last time step and whether the predictive state was due to inter-lateral signals 1270 or intra-lateral signals 1268.

The cell activator 1418 receives the feedforward signal 1146, the predictive signal 1441, and inhibition signal 926, and places the cell 1290 in an activated state according to a set of activation and inhibition rules, as described below in further detail in reference to FIG. 15. The pooling input 1443 may especially indicate predictive states of other cells in the same column as cell 1290. One additional condition for cell activation is that there be no inhibition signals 1426 from other cells in the output processor 412. If inhibition signal 1426 is received from other cells, cell 1290 is not activated despite feedforward signal 1146. For example, if cell 1290 receives inhibition signal 1426 from other cells within a predetermined distance from the cell 1290, cell 1290 is not activated despite feedforward signal 1146. If the cell 1290 is placed in an activated state, the cell activator 1418 generates pooling output 1120 indicating whether the cell is active, or was predictive and became active. In one embodiment, pooling output 1120 is generated regardless of the reasons cell 1290 is activated.

In response to activation of the cell 1290 by the cell activator 1418, cell inhibitor 1424 generates inhibition signal 1428. Inhibition signals 1428 are sent to other cells in the same column or in a different column to inhibit activation of the other cells.

Example Activation Rules of Cell in Output Processor

Figure 15:
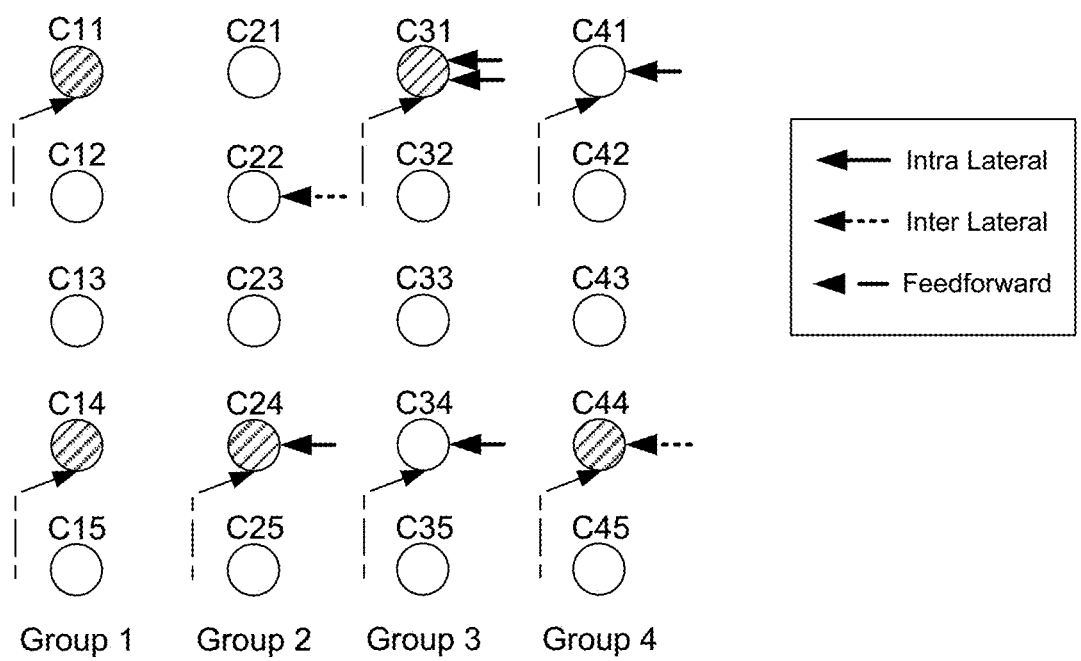
FIG. 15 is a diagram illustrating activating cells or inhibiting activation of cells in the output processor based on various rules, according to embodiments.

FIG. 15 is a diagram illustrating activating cells or inhibiting activation of cells in the output processor 412 based on various rules, according to embodiments. In the example of FIG. 15, some of the cells generate inter-lateral hit signal 1434, intra-lateral hit signal 1430, and/or feedforward hit signal 1438. The cells are arranged in groups (groups 1 through 4) that are placed within a predetermined distance from each other in the output processor 412 that influence activation and inhibition states between one another. However, each group in FIG. 15 may also represent a column of cells. "Intra Lateral" arrows (solid) indicate that the cell has generated intra-lateral hit signal 1430, and "Inter Lateral" arrows (dotted) indicate that the cell has generated inter-lateral hit signal 1434, and "Feedforward" arrows (dashed) indicate that the cell has received feedforward signal 1146. The rules associated with the operations of cells described below with reference to FIG. 15 are merely for illustration. One or more of these rules may be used in conjunction, selective selected or discarded, and/or varied during operation of the processing nodes.

One of the rules is if no cells generate lateral hit signals 1430, 1434, the cells that receive feedforward signal 1146 are activated. As shown in group 1, cells C11 and C14 receive feedforward signals 1146. Since no other cell generates lateral hit signals, cells C11 and C14 are activated.

Another rule is to have cells that receive feedforward signal 1146 and generate at least one lateral hit signal 1434, 1430 inhibit activation of cells that only generate lateral hit signals 1434, 1430 in the same column. As shown in group 2, cell C24 receives feedforward signal 1146 and intra-lateral hit signal 1430, and cell C22 generates inter-lateral hit signal 1434. Only cell C24 is activated whereas cell C22 is not activated because cell C24 (receiving the feedforward signal 1146 and generating intra-lateral hit signal 1430) inhibit the activation of cell C22 (generating only inter-lateral hit signal 1434).

Another rule is to have cells that generate a higher number of lateral hit signals 1430, 1434 to inhibit activation of cells that generate fewer number of lateral hit signals 1430, 1434 in the same column or a subset of cells in the output processor 412, responsive to receiving the feedforward signal 1146. As shown in column 3, cell C31 generates receives feedforward signal 1146 and generates two intra-lateral hit signals 1430, and cell C34 generates receives feedforward signal 1146 and generates one intra-lateral hit signal 1430. Only cell C31 is activated whereas cell C34 is not activated because cell C31 generates a higher number of lateral hit signals than cell C34.

Another rule is to have cells that generate inter-lateral hit signals 1434 inhibit activation of cells that generate intra-lateral hit signals 1430, responsive to receiving feedforward signal 1146. As shown in group 4, cell C44 receives feedforward signal 1146 and generates an inter-lateral hit signal 1434, and cell C41 receives feedforward signal 1146 and generates an intra-lateral hit signal 1430. Only cell C44 is activated whereas cell C41 is not activated because cell C44 generates inter-lateral hit signal 1434.

Another rule is to select cells that were previously active for activation. For example, a cell that was active in the previous time step and is predictively active in the current time step may be selected for activation over a cell that is only predictively active in the current time step.

Another rule is to require a certain number of cells to be active within a given group. In such an instance, the activation and inhibition rules described above may be used to activate cells until the required number of cells are activated.

The rules illustrated in conjunction with FIG. 15 are merely examples. Other activation and inhibition rules for the inference system 104 may also be implemented.

Multi-layered Learning and Inferencing System

Figure 16:
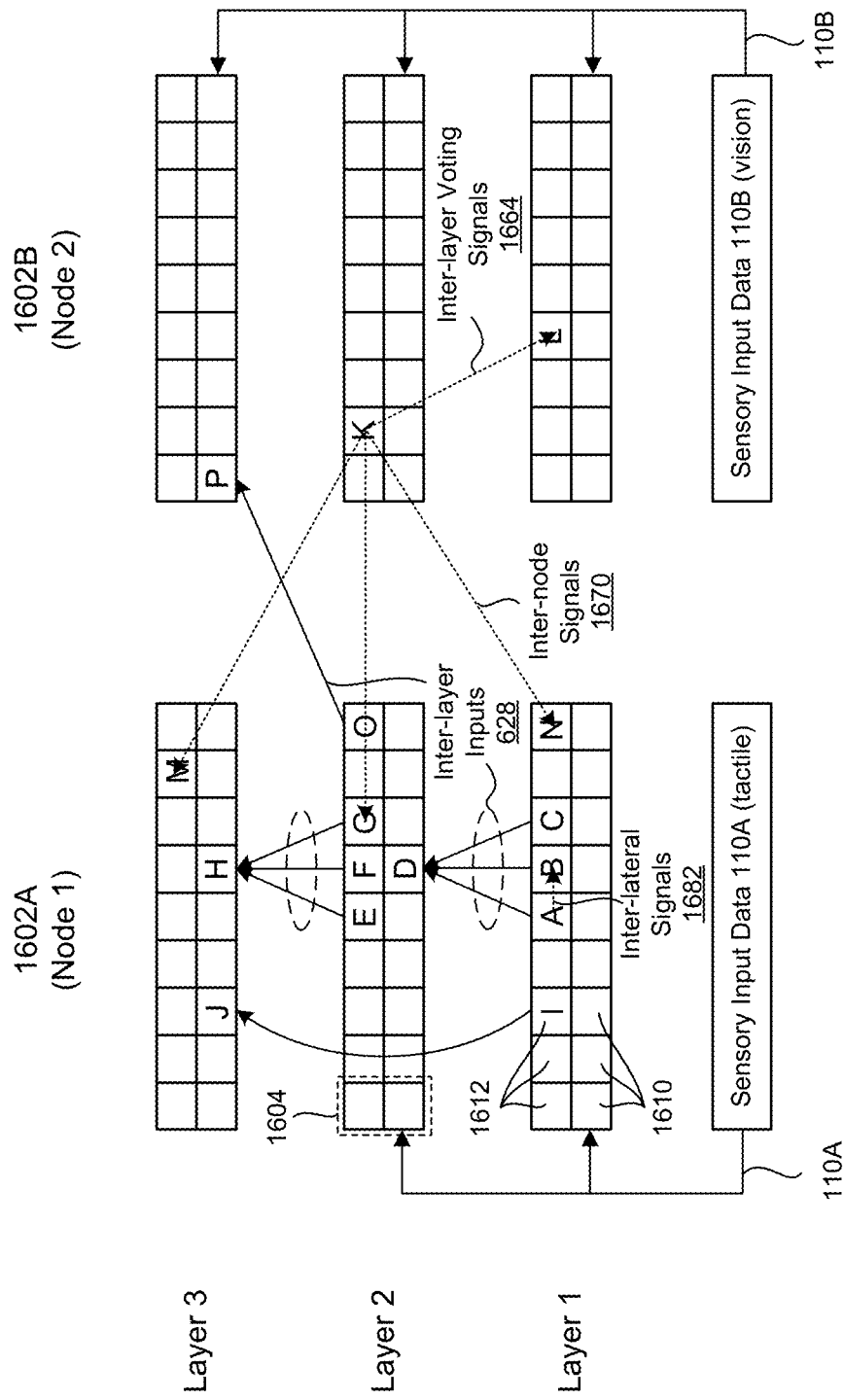
FIG. 16 is a detailed block diagram illustrating two multi-layer systems, according to one embodiment.

FIG. 16 is a detailed block diagram illustrating two multi-layer systems 1602A, 1602B, according to one embodiment. A multi-layer system includes a plurality of inference systems arranged in one or more hierarchical layers. One of many features of the multi-layer systems is that its inference systems can perform inference and form their own versions of representations of objects, regardless of the level and layer of the inference systems. Inference systems at lower layers of a multi-layer system pass representation of objects to inference systems at higher layers. By integrating many inference systems that are each capable of building and using their own versions of models of objects, the multi-layer systems can quickly and more efficiently perform inferencing and learning of objects at different levels of spatial scales and abstraction levels. Such multi-layered system may also be referred to as a "thousand brains" system because each system or its subsystems can build their own models of objects.

A multi-layer system described herein may correspond to a node described above with reference to FIG. 2. Each node receives a set of sensory input data for hierarchical processing, and may be grouped to perform processing for the sensory input data associated with different sensor characteristics, sensor modalities (e.g., vision sensor input data versus tactile sensor input data), and the like. For example, inference systems for a first node 210A may receive tactile sensory input data from a set of robotic fingers, and inference systems for a second node 210B may receive optical sensory input data from a set of robotic cameras.

In one embodiment, inference systems at a particular layer of a node can receive non-hierarchical voting inputs from inference systems at different layers of the same node, or from inference systems of other multi-layer systems at different nodes. The different nodes may be placed at the same level or at different levels, as described in conjunction with FIG. 2. An inference system in a layer receives the voting inputs that reinforce inferencing or detection of an object. In other words, non-hierarchical voting signals provide input on whether a set of candidate object representations in an inference system is consistent with object representations that are being detected in inference systems at other layers of the hierarchy, or inference systems at other multi-layer systems. For example, an inference system for a set of tactile sensors may generate a set of candidate objects and receive input from object representations that are being detected in an inference system for a set of vision sensors. The inference system can process the inputs to further narrow down the set of candidate objects such that the candidate objects are consistent with the object representations detected using the set of vision sensors. Thus, inference systems of the multi-layer system can infer or identify an object corresponding to the sensor input data more accurately with less sensor input data at a faster speed.

FIG. 16 illustrates, among other components, a multi-layer system 1602A and a multi-layer system 1602B (collectively referred to as "multi-layer systems" or individually as "multi-layer system"). Each multi-layer system 1602 is arranged in three layers, layer 1, layer 2, and layer 3. Each layer includes a set of inference systems 1604 that each include an input processor 1610 and an output processor 1612. In FIG. 16, each inference system is represented by a column of boxes, for example, as indicated by a dashed box 1604 in layer 2. Multi-layer system 1602A (or node 1) receives sensory input data 110A for a set of tactile sensors, and multi-layer system 1602B (or node 2) receives sensory input data 110-2 for a set of vision sensors. Sensory input data 110A received by multi-layer system 1602A is provided to input processors 1610 at layers 1 and 2 of the multi-layer system 1602A. Sensory input data 110B received by multi-layer system 1602B is provided to input processors 1610 at each level of the multi-layer system 1602B. However, these are merely illustrative, and in practice, sensory input data 110 may be provided to any one or a combination of the input processors 1610 in a multi-layer system. For example, sensory data 110 may be exclusively provided to the input processors at the first layer of the multi-layer system. Although three levels of inference systems are shown in FIG. 16, in practice, there may be fewer or more levels, with any number of inference systems. Moreover, although two multi-layer system 1602 are shown in FIG. 16, in practice, there may be fewer or more multi-layer systems depending on the modality or arrangement of sensors.

Except for the additional features related to additional signals and processing described below with reference to FIGS. 16 through 20, the operations and functions of the input processors 1610 and output processors 1612 are substantially similar to those described in conjunction with FIGS. 1 through 15, and detailed description will be omitted for the sake of brevity.

In addition to the operations described in FIGS. 6 through 10, cells in the input processor 1610 at higher layers (e.g., layer 2 or layer 3) of a multi-layer system can be activated responsive to receiving column activation signals that include inter-layer inputs 628 from output processors 1612 at lower layer (e.g., layer 1 or layer 2), in addition to signals from sensory input data 110 and location information 120. In one embodiment, the inter-layer inputs 628 are provided in a convergent manner, in which inter-layer inputs from multiple output processors 1612 at a lower layer are provided to a common input processor 1610 at a higher layer. For example, as shown in FIG. 16, output processors A, B, C at layer 1 of the multi-layer system 1602A provides inter-layer inputs 628 to a common input processor D at layer 2 of the multi-layer system 1602A. Similarly, output processors E, F, G at layer 2 of the multi-layer system 1602A provide inter-layer inputs 1628 to a common input processor H at layer 3. Moreover, inter-layer inputs 628 can also be provided to input processors that are located multiple layers higher than the layer at which the inter-layer inputs 628 originate. For example, as shown in FIG. 16, output processor I" in layer 1 provides inter-layer inputs 628 to input processor J at layer 3. Moreover, input processors 1610 can be activated responsive to receiving column activation signals that include inter-layer inputs 628 from output processors 1612 at different nodes within the same level or at different levels. For example, as shown in FIG. 16, output processor O at layer 2 of the multi-layer system 1602A provide inter-layer inputs 628 to output processor P at layer 3 of multi-layer system 1602B. The inter-layer inputs 628 may be provided from output processors from nodes at the same level or at different levels.

By performing hierarchical processing across multiple layers having input processors 1610 at higher layers receive object representations generated by output processors 1612 at lower layers, the inference systems can perform inference and learning of objects at different layers of spatial, temporal or logical scales. For example, when the sensory input data 110 for a set of visual sensors are optical signals of letters of varying sizes, inference systems at layer 1 only may recognize the smallest discernable size, while larger printed letters may be recognized at inference systems at layers 1 and 2. Even larger letters may be too large to recognize for inference systems at layer 1 but may be recognizable by inference systems at layer 2.

A combination of cells in the output processor 1612 are activated to represent one or more candidate objects associated with the sensory input data. Specifically, cells in the output processor 1612 are activated based on the activated cells in the corresponding input processor 1610 as well as other signals that the cell receives. Such signals received at the cell including, but not limited to, voting signals from output processors 1612 at different layers of the same multi-layer system, or from output processors 1623 of different multi-layer systems, inter-lateral 1682 signals, intra-lateral signals, or feedback signals. In one embodiment, the voting signals include inter-layer voting signals 1664 and inter-node signals 1670, in addition to intra-lateral 1682 and inter-lateral signals. In addition to the operations described in FIGS. 11 through 15, the object representations of output processors 1612 (as a combination of activated cells) at lower layers of a multi-layer system may be provided as inter-layer inputs 628 to input processors 1610 at higher layers.

Cells in an output processor 1612 may be predictively activated or activated responsive to receiving inter-layer voting signals 1664 from cells in output processors 1612 at different layers in the same multi-layer system that are associated with the same object representation. The inter-layer voting signals 1664 are received via inter-layer voting connections that are connections between a subset of cells in an output processor 1612, and another subset of cells in an output processor 1612 at a different layer in the hierarchy for transmitting inter-layer voting signals 1664 or from different inference systems within nodes at the same level or within nodes at different levels. Thus, cells in an output processor 1612 that represent objects common with those represented in output processors 1612 at different layers are reinforced through inter-layer voting connections. For example, as shown in FIG. 16, output processor K at layer 2 of the multi-layer system 1602B provides inter-layer voting signals to output processor L at layer 1 of the multi-layer system 1602A. In one embodiment, inter-layer voting connections between cells may be severed or generated during the learning process.

Cells in an output processor 1612 may be predictively activated or activated responsive to receiving inter-node voting signals 1670 from cells in output processors 1612 at different multi-layer systems that are associated with the same object representation. The inter-node voting signals 1670 are received via inter-node voting connections that are connections between a subset of cells in an output processor 1612, and other subsets of cells in output processors 1612 at different multi-layer systems for transmitting inter-node voting signals 1670. Thus, cells in an output processor 1612 that represent objects common with those represented in output processors 1612 at various layers of different multi-layer systems are reinforced through inter-node voting connections. For example, as shown in FIG. 16, output processor K at layer 2 of the multi-layer system 1602B provides inter-node voting signals 1670 to output processors M, G and N of the multi-layer system 1602A. In one embodiment, inter-layer voting connections between cells may be severed or generated during the learning process.

In addition, similarly to the output processor 412 described in conjunction with FIGS. 4 and 11-15, cells in the output processor 1612 may be predictively activated or activated responsive to receiving inter-lateral signals 1682 from cells in output processors 1612 at the same layer that are associated with the same object representation, or responsive to receiving intra-lateral signals from cells in the same output processor 1612 (not shown in figure). For example, as shown in FIG. 16, output processor A at layer 1 of the multi-layer system 1602A provides inter-lateral signals 1682 to output processor B of the multi-layer system 1602A.

In one embodiment, connections between cells are learned by selecting and maintaining activation for a subset of cells in the output processors 1612 for an object, and forming connections between cells in the input processors 1610 and the output processors 1612 based on sensory input data 10 at various locations on the object. Specifically, each output processor 1612 at various layers of the hierarchy selects a subset of cells for activation that correspond to a particular object. In addition to forming intra-lateral and inter-lateral connections as described in conjunction with FIG. 4, an activated cell in an output processor 1612 selects a subset of activated cells in output processors 1612 at different layers of the multi-layer system and forms inter-layer voting connections with the selected subset of cells. The activated cell in the output processor 1612 also selects a subset of activated cells in different multi-layer systems of different nodes and forms inter-node connections with the selected subset of cells.

In one embodiment, each inter-layer voting connection and each inter-node connection is associated with a permanence value indicating the frequency of that connection. In other words, the permanence value for an inter-layer voting connection indicates frequency of cell activations in the output processors 1612 due to the activation of cells connected to the active cells through inter-layer voting connections. The permanence value for an inter-node connection indicates frequency of cell activations in the output processors 1612 due to the activation of cells connected to the active cells through inter-node connections. The permanence value may be adjusted through the learning process to sever existing lateral connections or generate new lateral connections.

Subsequently, the input processor 1610 for a sensor receives sensory input data 110 at a given location on the particular object. The input processors 1610 at different layers of the hierarchy activate a subset of cells responsive to receiving column activation signals from sensory input data 110 and location information 120 and/or activated cells from output processors 1612 at lower layers of the hierarchy. Similarly to the embodiment described in conjunction with FIG. 4, each inference system 104 may select a random cell in each column that receives the column activation signal, and these cells are associated with the location included in the received location information 120 and/or the activation states of the cells in output processors 1612 at lower layers of the hierarchy. The selected cells are activated. An activated cell in the input processor 1610 may then select a subset of cells in the corresponding output processor 1612 of the same inference system 104 and form feedforward and feedback connections with the selected subset of cells, as described in conjunction with FIG. 4.

The learning process is repeated when the sensor senses a new location on the object, leading to new sensory input data 110 and location information 120. The learning process is completed for the particular object when, for example, each sensor has sensed sensory features on a set of locations on the object. When a new object is learned, the cells in the input processors 1610 and the output processors 1612 are deactivated, and the process described above is repeated for the new object.

Performing Inference Using Inference Systems in Multi-layer Systems

Figure 17A:
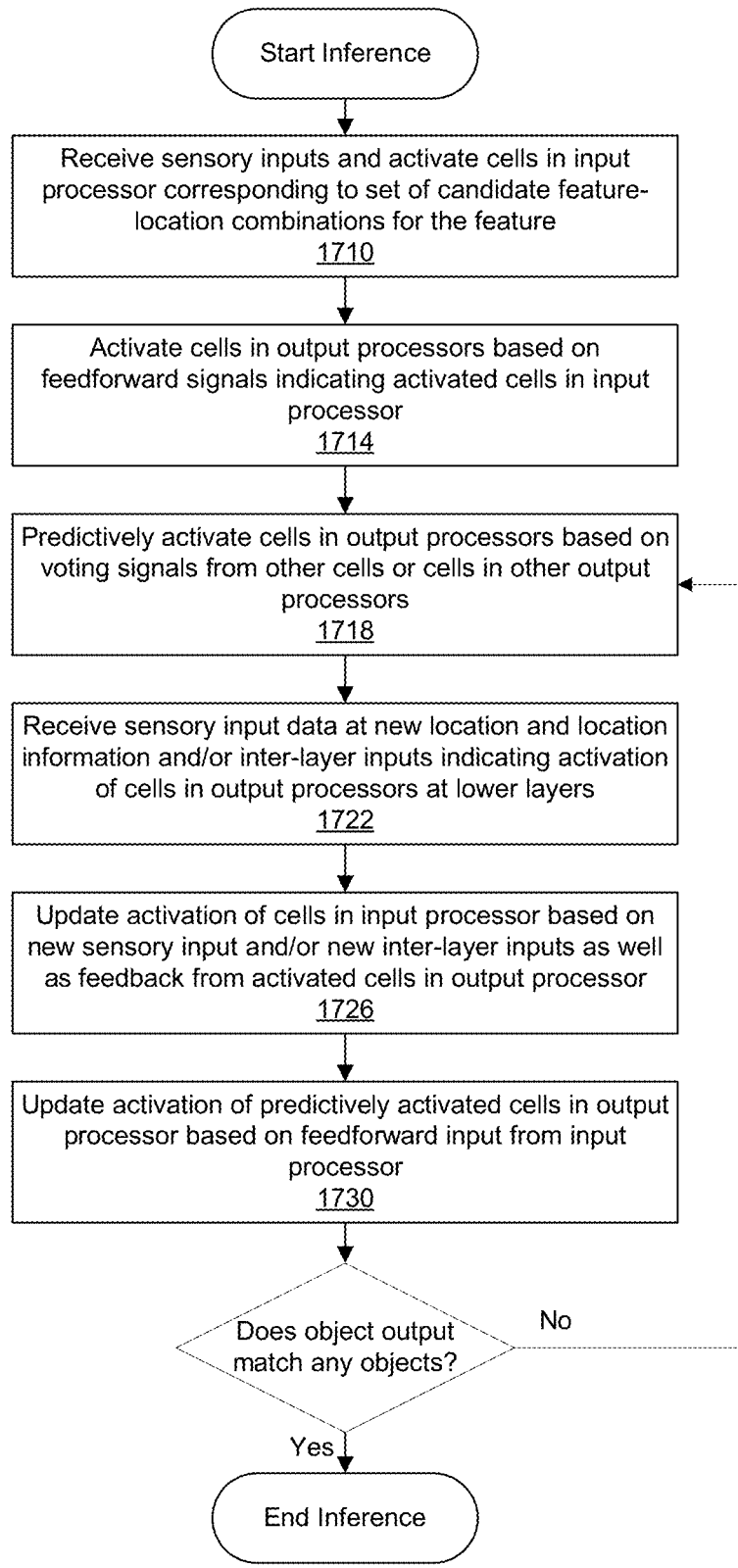
FIG. 17A is a flowchart illustrating a method of performing inference using inference systems in multi-layer systems, according to one embodiment.

FIG. 17A is a flowchart illustrating a method of performing inference using inference systems 104 in multi-layer systems, according to one embodiment. Input processors 1610 at various layers of the hierarchy receive 1710 sensory input data 110 from a corresponding sensor, and activates cells associated with the feature described in the sensory input data 110. Thus, the combination of activated cells in the input processor 1610 represents the set of candidate feature-location representations associated with the particular feature. Each input processor 1610 generates and provides the activation states of the cells as feedforward signals 1640 to cells in the corresponding output processor 1612 of the same inference system 104 that have feedforward connections with the activated cells in the input processors 1610.

The output processors 1612 activate 1714 cells based on the feedforward signals indicating activation states of cells in corresponding input processors 1610. Thus, the set of activated cells in each output processor 1612 represents the set of candidate objects consistent with the candidate feature-location representations in the input processor 1610 of the same inference system 104. An output processor 1612 generates and provides the activation states of the cells as feedback input to cells in the corresponding input processor 1610 with feedback connections to the activated cells. An output processor 1612 also provides voting signals to cells in the same output processor or to other processors in the form of inter-lateral signals, intra-lateral signals, inter-layer voting signals, and inter-node signals. The cells in output processors 1612 that receive these voting signals are predictively activated 1718.

Input processors 1610 receive 1722 sensory input data 110 at a new location due to, for example, movement of the sensor. The input processors 1610 also receive location information 120 indicating a set of updated potential locations based on a determined location shift of the sensor from the previous location, and/or inter-layer inputs from other output processors 1612 at lower layers of the hierarchy. The input processors 1610 update 1726 activation of cells by providing column activation signals to columns of cells that are obtained from the new sensory input data 110 and/or inter-layer inputs. The activation of cells is updated also based on feedback input indicating activation states of the cells in the corresponding output processor 1612 of the same inference system 104. Thus, the set of activated cells in the input processor 1610 represent feature-location representations consistent with the updated sensory input data 110 and location information 120, as well as the set of candidate objects passed from the output processors 1612 at lower layers. The input processor 1610 again provides the activation states of the cells as feedforward signals to cells in the corresponding output processor 1612.

The output processor 1612 updates 1730 activation of predictively activated cells based on the new feedforward signals indicating activation states of cells in the corresponding input processor 1610. Thus, the set of activated cells in the output processor 1612 represents candidate objects consistent with the set of updated candidate feature-location representations, as well as candidate objects in other output processors 1612, including output processors 1612 at different layers of the hierarchy, and output processors 1612 at different multi-layer systems that correspond to, for example, different sensor modalities. If the activated cells in one or more output processors 1612 match a single object, than the inference is completed. Otherwise, the process is repeated to update voting signals as sensory input data 110 at a new location is received.

Similarly to the description in FIG. 4, the output processors 1612 determine that a subset of activated cells match an object if a predetermined threshold of activated cells in the output processors 1612 are associated with a given object.

The steps shown in FIG. 17A are merely illustrative. One or more of these steps may be used in conjunction, selective chosen or discarded, and/or varied during operation of the inference process. For example, one or more of these steps may be performed in parallel and not in a particular sequence.

Learning of Connections for Inference

Figure 17B:
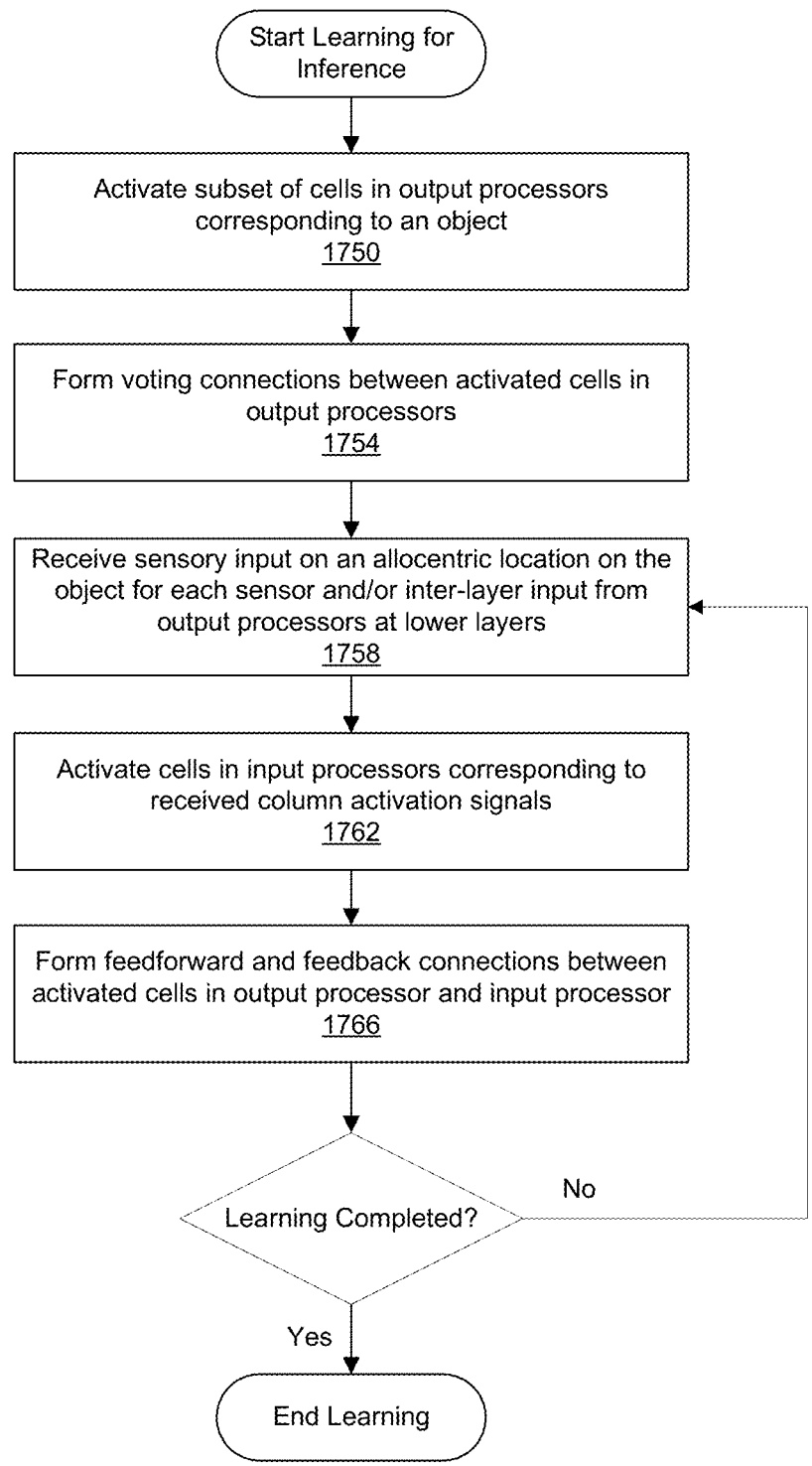
FIG. 17B is a flowchart illustrating a method of learning connections for inference in multi-layer systems, according to one embodiment.

FIG. 17B is a flowchart illustrating a method of learning connections for inference in multi-layer systems, according to one embodiment. A subset of cells in output processors 1612 are selected to represent an object when the cells are activated 1750. The combination of activated cells across one or more output processors 1612, when activated, indicates that the object is detected. Voting connections are formed 1754 between activated cells in output processors 1612. Voting connections may include inter-layer voting connections, inter-node connections, inter-lateral connections, and intra-lateral connections.

The input processors 1610 receive 1758 sensory input data 110 associated with an allocentric location on the object, and/or inter-layer inputs indicating activation states of output processors 1612 at lower layers of the hierarchy.

A subset of cells in the input processor 1610 are activated 1762 based on column activation signals generated from these inputs. Feedforward and feedback connections are formed 1766 between activated cells of output processors 1612 and all or a subset of the activated cells in the corresponding input processors 1610. If the learning process is not completed, the process repeats such that the sensors receive new sensory input data 110 on a new location on the object.

After completing learning for an object, learning for a new object can be performed by activating a different subset of cells in output processors 1612 to represent the new object when the cells are activated, and repeating subsequent processes as illustrated in FIG. 17B.

The steps shown in FIG. 17B are merely illustrative. One or more of these steps may be used in conjunction, selective selected or discarded, and/or varied during operation of the learning process. For example, one or more of these steps may be performed in parallel and not in a particular sequence.

Example Architecture of Output Processor in a Multi-layer System

Figure 18:
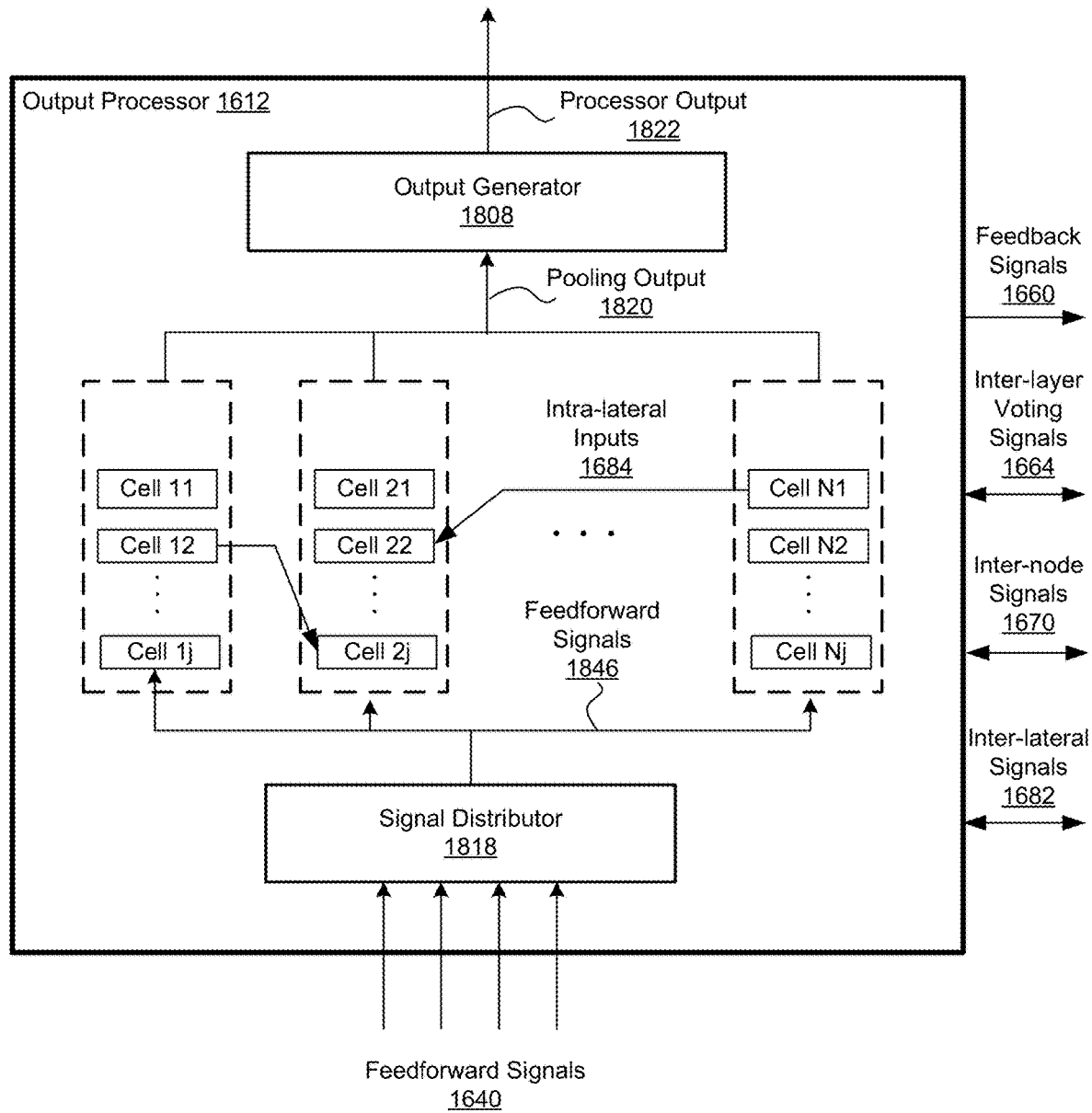
FIG. 18 is a detailed block diagram illustrating an output processor in a multi-layer system, according to one embodiment.

FIG. 18 is a detailed block diagram illustrating an output processor 1612 in a multi-layer system, according to one embodiment. Output processor 1612 may include, among other components, an output generator 1808, a set of cells 11 through Nj (in dashed boxes), and a signal distributor 1818. As described previously in conjunction with FIG. 4, in one embodiment, the cells of the output processor 1612 may optionally be arranged in columns. Except for the additional description provided below, the operations and functions of output processor 1612 are substantially similar to those described in conjunction with FIG. 11, and detailed description will be omitted for the sake of brevity.

The output processor 1612 receives feedforward signals 1640 indicating activation states of cells in a corresponding input processor 1610 in an inference system 104. The feedforward signals 1640 are fed to appropriate cells in the output processor 1612 through feedforward signals 1846. The output processor 1612 also generates feedback signals 1664 indicating activation states of cells in the output processor 1612. As described above with reference to FIG. 16, the feedback signals 1664 are fed to the corresponding input processor 1610.

As described in conjunction with FIG. 16, the output processor 1612 receives and outputs voting signals from other output processors 1612 that may include, but are not limited to, lateral signals, inter-layer voting signals 1664, and inter-node signals 1670. Specifically, the output processor 1612 receives inter-layer voting signals 1664 as inter-layer voting inputs from cells in output processors 1612 at different layers through inter-layer connections. Activated cells in the output processor 1612 also output inter-layer voting signals 1664 as inter-layer voting outputs to other cells through inter-layer connections. The output processor 1612 receives inter-node signals 1670 as inter-node inputs from cells in output processors 1612 at different multi-layer systems through inter-node connections. Activated cells in the output processor 1612 can also output inter-node signals 1670 as inter-node outputs to other cells through inter-node connections. Similarly to the embodiment described in FIG. 11, the output processor 1612 may also receive and output lateral signals, including inter-lateral signals 1682 and intra-lateral signals 1684. In one embodiment, the output processor 1612 may receive voting signals from any other component anywhere as long as that component is also recognizing or representing the same object.

Different from the output processor 1612 described in conjunction with FIG. 11, cells in output processor 1612 may become predictive (i.e., placed in a predictive state) in response to receiving voting signals including lateral signals, inter-layer voting signals 1664, and inter-node signals 1670. Once a cell in the output processor 1612 is predictively activated, the cell may maintain its predictive state for a predetermined length of time.

Cells in output processor 1612 that receive voting signals may become predictive. Predictive cells that receive feedforward signals may be activated. In one instance, cells that were predictively active and become active are activated for a longer period of time compared to cells that were not predictively active and became active. In this manner, the subset of cells in the output processor 1612 that are consistent with the feature-location representations formed in the corresponding input processor 1610 and candidate objects in output processors at other layers and at other multi-layer systems are activated. In general, cells in output processors associated with the object being detected are more likely to be predictively activated through voting connections to other cells associated with the object. Over time, these cells are in turn activated responsive to receiving feedforward signals 1640 indicating presence of feature-location representations associated with the object. Thus, the subset of cells associated with the object will remain active after iterating through the process of updating activation states of cells in the input processor 1610 and the output processor 1612 for an inference system 104. In one embodiment, cells in output processor 1612 that receive sufficiently strong voting signals may become active even in the absence of any feedforward signals.

In one embodiment, if cells in a predictive state were predictively active due to lateral signals transmitted through voting signals, and feedforward signal resulted in correct activation of the cell, the permanence values for lateral connections to activated cells in output processors 1612 are increased whereas the permanence values for connections to inactivated cells in output processors 1612 are decreased. On the other hand, if cells in the predictive state are not followed by activation of the cells, the permanence values for voting connections to activated cells in output processors 1612 are decreased. If a permanence value for a connection drops below a threshold value, the connection may be severed. In this manner, connections between cells in output processors 1612 with low permanence values no longer contribute to activation of cells.

Continuing with the example, if no cell in the column is currently in a predictive state, cells receiving feedforward signals 1846 are activated. For example, if no cell in the column is currently in a predictive state, all cells in the column may be activated.

The cells individually, or collectively as a column, send pooling output 1820 to output generator 1808. The pooling output 1820 identifies the state of the cells, similar to the pooling output 1120 described in conjunction with FIG. 11. In one embodiment, output generator 1808 collects the pooling outputs 1820 from the cells and concatenates these outputs into a vector. In one embodiment, the output generator 1808 generates the concatenated vector and provides the processor output 1822 as inter-layer inputs 628 to an input processor 1610 at a different layer of the multi-layer system, such that they can be provided as column activation signals to columns of cells in conjunction with sensory input data 110. For example, activation of any cells in columns 1 and N of the output processor 1612 may be provided as inter-layer inputs 628, and eventually as column activation signals to columns of an input processor 1610 at the next layer. In another embodiment, the output generator 1808 generates the concatenated vector as output representing an object. The inference system 104 determines whether the set of activated cells indicated in the processor output 1822 matches known object representations, and generates the set of candidate objects.

Example Diagram of Cell in Output Processor in Multi-layer System

Figure 19:
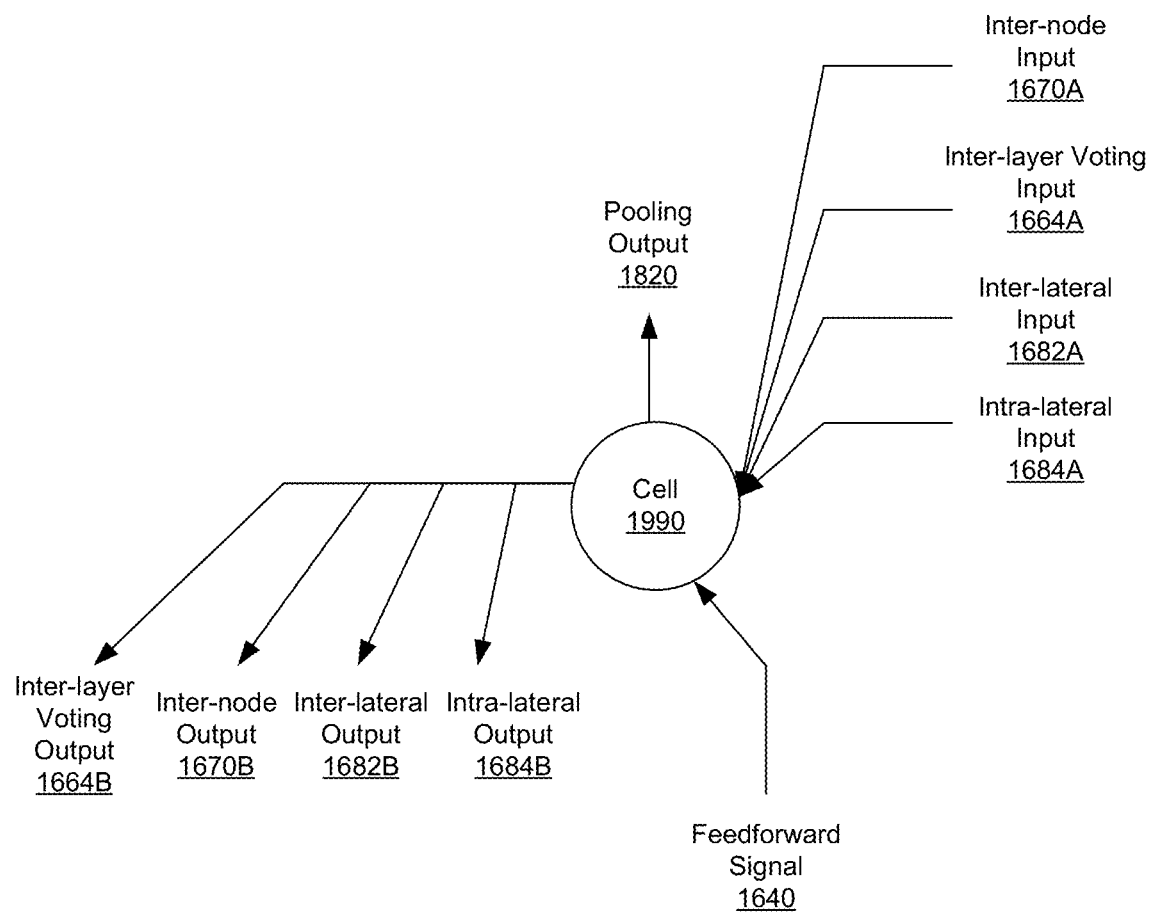
FIG. 19 is a conceptual diagram illustrating signals associated with a cell in the output processor, according to one embodiment.

FIG. 19 is a conceptual diagram illustrating signals associated with a cell 1990 in the output processor 1612, according to one embodiment. As discussed in reference to FIG. 18, cell 1990 receives various voting inputs. Specifically, cell 1990 receives inter-lateral inputs 1684A indicating activation of cells in other output processors 1612 at the same layer in the hierarchy, and intra-lateral inputs 1682A indicating activation of cells in the same output processor 1612. Cell 1990 also receives inter-layer voting inputs 1664A indicating activation of cells in other output processors 1612 at different layers of the hierarchy. Cell 1990 also receives inter-node inputs 1670A indicating activation of cells in output processors 1612 at different multi-layer systems. As discussed in reference to FIG. 18, cell 1990 may become predictively active when it receives voting inputs. Cell 1990 also receives feedforward signal 1640 indicating activation of cells in the corresponding input processor 1610 with feedforward connections to the cell 1990.

Responsive to activation, cell 1990 also generates intra-lateral outputs 1684B to cells connected through intra-lateral connections, inter-lateral outputs 1682B to cells connected through inter-lateral connections, inter-node outputs 1670B to cells connected through inter-node connections, and inter-layer voting outputs 1664B to cells connected through inter-layer voting connections. As described in conjunction with FIG. 18, cell 1990 may also generate pooling output 1820 that may be provided as inter-layer inputs 628 to another input processor 1610, or represented as an object output.

In one embodiment, cell 1990 is activated when (i) cell 1990 is in a predictive state and receives feedforward signals 1640, and/or (ii) cell 1990 is not in a predictive state but is nonetheless selected for activation in response to feedforward signals 1640. Responsive to being activated, cell 1990 may provide feedback signals 1660 indicating its activation state to cells in the corresponding input processor 1610 with feedback connections to the cell 1990.

The structure of a cell 1990 is similar to the structure of cell 790 illustrated in FIG. 9 except that the cell 1990 includes monitors for receiving additional voting signals and the cell activation predictor takes into account the hit signals associated with these additional voting signals to activate the cell 1990.

Example Operations and Functions of Cells in Multi-layer System

Figure 20:
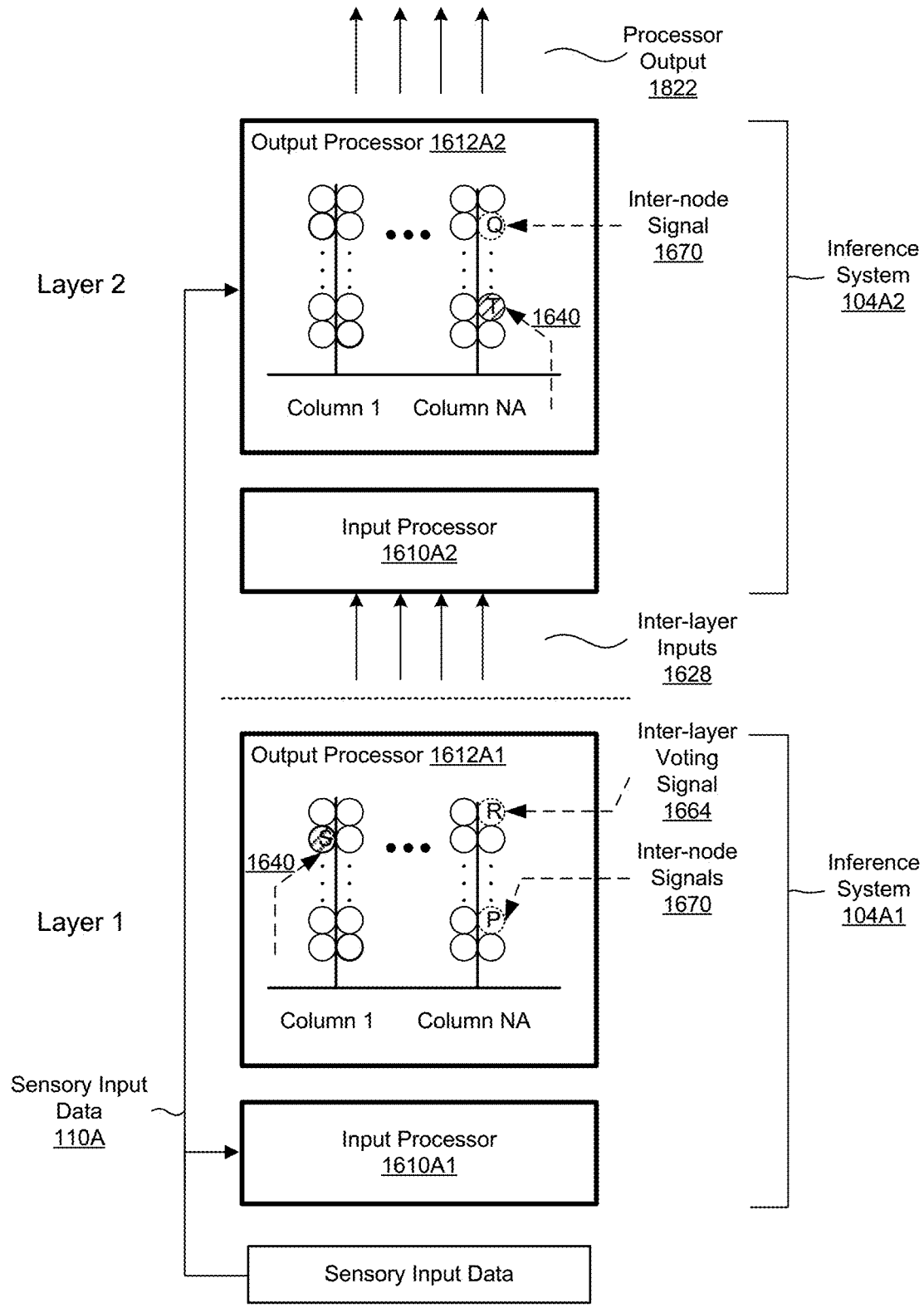
FIG. 20 illustrates example operations and functions of cells in a multi-layer system, according to one embodiment.

FIG. 20 illustrates example operations and functions of cells in a multi-layer system, according to one embodiment. The example in FIG. 20 illustrates inference systems 104 in two layers of a multi-layer system. Specifically, inference system 104A1 is at layer 1, and inference system 104A2 is at layer 2 of the multi-layer system. Inference system 104A1 includes, among other components, input processor 1610A1 and corresponding output processor 1612A1, and inference system 104A2 includes input processor 1610A2 and corresponding output processor 1612A2. However, FIG. 20 is merely an illustration and in practice, there may be additional hierarchical layers as well as a fewer or greater number of inference systems 104 and multi-layer systems.

Input processors 1610A1, 1610A2 receive sensory input data 110A. In particular, sensory input data 110A may be obtained from a sensor. Since input processor 1610A2 is at a higher layer than output processor 1612A1, input processor 1610A2 may also receive inter-layer inputs 628 based on activation of cells in output processor 1612A1. Moreover, inter-layer inputs 628 may be provided to input processor 1610A2 in a converging manner, in which inter-layer inputs 628 from multiple output processors 1612 (e.g., output processor B, output processor C at layer 1 of FIG. 16) at the lower layer are provided to input processor 1610A2 (e.g., input processor D in layer 2 of FIG. 16). Based on the received sensory input data 110, and/or the inter-layer inputs 628, column activation signals 1640 corresponding to columns of cells in the input processor 1610 are generated, and used to activate cells in the input processor 1610. The activation states of the cells in input processor 1610A1 are provided to a subset of cells in output processor 1612A1, and the activation states of cells in input processor 1610-A2 are provided to a subset of cells in output processor 1612A2 as feedforward signals.

As shown in FIG. 20, output processor 1612A1 and output processor 1612A2 each have NA columns of cells. Cells of output processors 1612 are placed in a predictive state responsive to receiving voting inputs from activated cells in other output processors 1612. As shown in FIG. 20, cell P in output processor 1612A1 and cell Q in output processor 1612A2 are placed in a predictive state responsive to receiving inter-node inputs 1670 from activated cells in output processors 1612 of different multi-layer systems. Cell R in output processor 1612A1 is placed in a predictive state responsive to receiving inter-layer voting inputs 1664 from cells in output processors 1612 at different layers of the multi-layer system.

Cells in output processors 1612A1 and 1612A2 are placed in an active state responsive to receiving column activation signal 1640 from activated cells in corresponding input processors 1610-A1 and 1610-A2. Specifically, cell S in output processor 1612-A1 and cell T in output processor 1612-A2 receive feedforward inputs 1640 and are placed in an active state. As described in conjunction with FIG. 18, cells in an output processor 1612 may become activated if they were placed in a predictive state and received feedforward inputs 1640 at the next time step. For example, cells S and T may have been in a predictive state, and placed in an active state at the current time step responsive to receiving feedforward inputs 1640. Alternatively, if no cells are in a predictive state, all or a subset of cells in output processor 1612 that receive feedforward inputs 1640 may be placed in an active state.

Activation states of output processors 1612A1 and 1612A2 are generated as processor outputs 1822. In particular, processing outputs 1822 from output processor 1612A1 indicate activation states of cells in output processor 1612A1, and are provided to input processor 1610A2 as inter-layer inputs 628. Processing outputs 1822 from output processor 1612A2 indicate activation states of cells in output processor 1612A2, and may be provided to another input processor 1610 at a higher layer in the hierarchy as inter-layer inputs 628, or may be generated as an object output.

Figure 21:
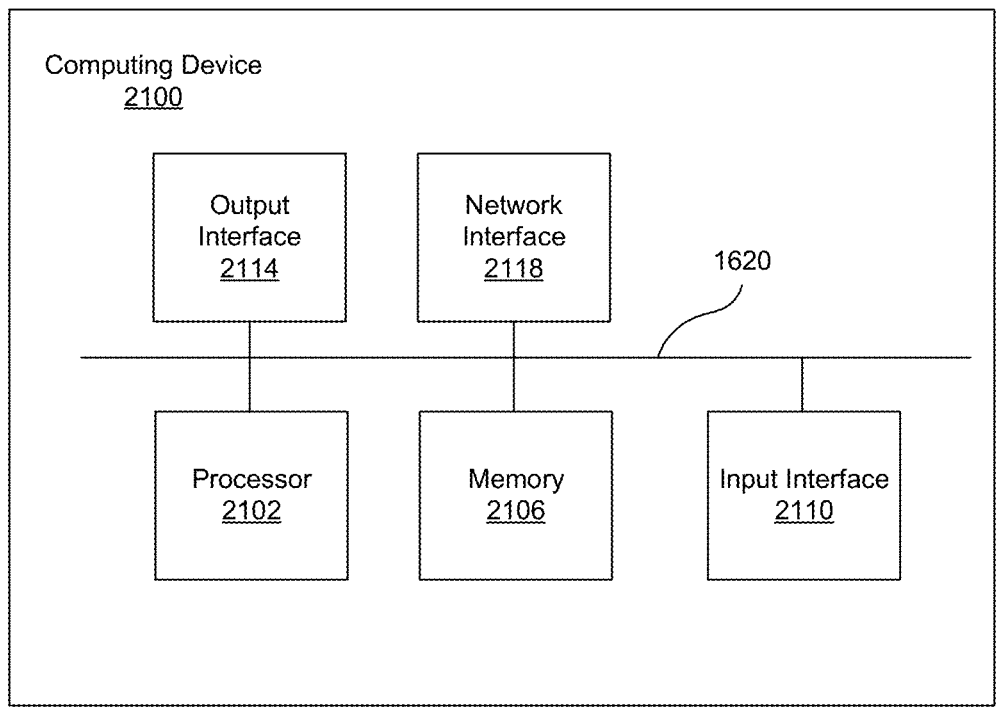
FIG. 21 is a block diagram of a computing device for implementing inference systems according to embodiments.

FIG. 21 is a block diagram of a computing device 2100 for implementing inference systems according to embodiments. The computing device 2100 may include, among other components, a processor 2102, a memory 2106, an input interface 2110, an output interface 2114, a network interface 2118 and a bus 2120 connecting these components. The processor 2102 retrieves and executes commands stored in memory 2106. The memory 2106 store software components including, for example, operating systems and modules for instantiating and executing nodes as described herein. The input interface 2110 receives data from external sources such as sensor data or action information. The output interface 2114 is a component for providing the result of computation in various forms (e.g., image or audio signals). The network interface 2118 enables the computing device 2100 to communicate with other computing devices by a network. When multiple nodes or components of a single node is embodied in multiple computing devices, information associated with temporal sequencing, spatial pooling and management of nodes may be communicated between computing devices via the network interface 2118.

Upon reading this disclosure, those of skill in the art will appreciate still additional alternative designs for processing nodes. Thus, while particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

The invention claimed is:

1. A computer-implemented method of performing inference using a plurality of inference systems, each inference system including a respective input processor and a respective output processor coupled to the respective input processor, the method comprising:
   generating, by a first input processor in a first inference system at a first layer of a multi-layer system, a first input representation by processing first sensory input indicating a first set of candidate pairs, the first set of candidate pairs indicating detection of a first feature of an unidentified object at first candidate locations on the unidentified object associated with the first feature;
   determining, by a first output processor in the first inference system, a first output representation corresponding to the first input representation by processing the first input representation, the first output representation indicating a first set of candidate objects associated with the first set of candidate pairs;
   generating, by a second input processor in a second inference system at a second layer of the multi-layer system higher than the first layer, a second input representation corresponding to at least the first output representation of the first output processor by processing the first output representation; and
   determining, by a second output processor in the second inference system, a second output representation corresponding to the second input representation by processing the second input representation, the second output representation indicating a second set of candidate objects associated with at least the first set of candidate pairs.

2. The computer-implemented method of claim 1, wherein the first sensory input is received from a first sensor, wherein the first input representation is generated by further processing the first sensory input, and wherein the second input representation is generated by further processing the first sensory input at the second input processor.

3. The computer-implemented method of claim 2, wherein a subset of cells in a third inference system is activated by processing second sensory input received from a second sensor of a modality different from a modality of the first sensor.

4. The computer-implemented method of claim 1, further comprising:
   generating, by a third input processor in a third inference system at the first layer, a third input representation by processing second sensory input indicating a second set of candidate pairs, the second set of candidate pairs indicating detection of a second feature of the unidentified object at second candidate locations associated with the second feature;
   determining, by a third output processor in the third inference system, a third output representation corresponding to the third input representation, the third output representation indicating a third set of candidate objects associated with the second set of candidate pairs,
   wherein the first output representation is an activation state of a subset of output cells in the first output processor and the third output representation is an activation state of a subset of output cells in the third output processor, and wherein the second input representation at the second layer is generated by processing at least the activation states of the subset of output cells in the first output representation and the activation states of the subset of output cells in the third output representation.

5. The computer-implemented method of claim 1, wherein the first output representation is an activation state of a subset of output cells in the first output processor, and wherein the second output representation is an activation state of a subset of output cells in the second output processor.

6. The computer-implemented method of claim 5, further comprising:
   sending the activation states of the subset of the output cells in the first output processor to columns of input cells in the second input processor to generate the second input representation.

7. The computer-implemented method of claim 5, further comprising:
   activating a subset of cells in a third inference system; and
   sending the activation states of the subset of the cells in the third inference system to one or more of the output cells of the first output processor or the second output processor, activation of the one or more of the output cells in the first output processor or the second output processor based further on the activation states of the subset of the cells in the third inference system.

8. The computer-implemented method of claim 7, wherein the third inference system is included in another multi-layer system different from the multi-layer system.

9. The computer-implemented method of claim 1, wherein the first output representation is determined by further processing activation states of output cells in a third inference system.

10. The computer-implemented method of claim 9, wherein the third inference system is at a layer other than the first layer.

11. The computer-implemented method of claim 1, wherein the second output representation is determined by further processing activation states of output cells in a third inference system at a layer other than the second layer.

12. The computer-implemented method of claim 11, wherein the third inference system is at a layer other than the second layer.

13. A non-transitory computer readable storage medium comprising instructions when executed by a processor cause the processor to instantiate a method of performing inference using a plurality of inference systems, each inference system including a respective input processor and a respective output processor coupled to the respective input processor, the method comprising:
  generating, by a first input processor in a first inference system at a first layer of a multi-layer system, a first input representation by processing first sensory input indicating a first set of candidate pairs, the first set of candidate pairs indicating detection of a first feature of an unidentified object at first candidate locations on the unidentified object associated with the first feature;
  determining, by a first output processor in the first inference system, a first output representation corresponding to the first input representation by processing the first input representation, the first output representation indicating a first set of candidate objects associated with the first set of candidate pairs;
  generating, by a second input processor in a second inference system at a second layer of the multi-layer system higher than the first layer, a second input representation corresponding to at least the first output representation of the first output processor by processing the first output representation; and
  determining, by a second output processor in the second inference system, a second output representation corresponding to the second input representation by processing the second input representation, the second output representation indicating a second set of candidate objects associated with at least the first set of candidate pairs.

14. The non-transitory computer readable storage medium of claim 13, wherein the first sensory input is received from a first sensor, wherein the first input representation is generated by further processing the first sensory input, and wherein the second input representation is generated by further processing the first sensory input at the second input processor.

15. The non-transitory computer readable storage medium of claim 14, wherein a subset of cells in a third inference system is activated by processing second sensory input received from a second sensor of a modality different from a modality of the first sensor.

16. The non-transitory computer readable storage medium of claim 13, further comprising:
  generating, by a third input processor in a third inference system at the first layer, a third input representation by processing second sensory input indicating a second set of candidate pairs, the second set of candidate pairs indicating detection of a second feature of the unidentified object at second candidate locations associated with the second feature;
  determining, by a third output processor in the third inference system, a third output representation corresponding to the third input representation, the third output representation indicating a third set of candidate objects associated with the second set of candidate pairs,
  wherein the first output representation is an activation state of a subset of output cells in the first output processor and the third output representation is an activation state of a subset of output cells in the third output processor, and wherein the second input representation at the second layer is generated by processing at least the activation states of the subset of output cells in the first output representation and the activation states of the subset of output cells in the third output representation.

17. The non-transitory computer readable storage medium of claim 13, wherein the first output representation is an activation state of a subset of output cells in the first output processor, and wherein the second output representation is an activation state of a subset of output cells in the second output processor.

18. The non-transitory computer readable storage medium of claim 17, further comprising:
  sending the activation states of the subset of the output cells in the first output processor to columns of input cells in the second input processor to generate the second input representation.

19. The non-transitory computer readable storage medium of claim 17, further comprising:
  activating a subset of cells in a third inference system; and
  sending the activation states of the subset of the cells in the third inference system to one or more of the output cells of the first output processor or the second output processor, activation of the one or more of the output cells in the first output processor or the second output processor based further on the activation states of the subset of the cells in the third inference system.

20. The non-transitory computer readable storage medium of claim 19, wherein the third inference system is included in another multi-layer system different from the multi-layer system.

21. The non-transitory computer readable storage medium of claim 13, wherein the first output representation is determined by further processing activation states of output cells in a third inference system.

22. The non-transitory computer readable storage medium of claim 21, wherein the third inference system is at a layer other than the first layer.

23. The non-transitory computer readable storage medium of claim 13, wherein the second output representation is determined by further processing activation states of output cells in a third inference system at a layer other than the second layer.

24. The non-transitory computer readable storage medium of claim 23, wherein the third inference system is at a layer other than the second layer.

25. A computing device, comprising:
  a first input circuit of a first inference system at a first layer of a multi-layer system, the first input circuit configured to generate a first input representation by processing first sensory input indicating a first set of candidate pairs, the first set of candidate pairs indicating detection of a first feature of an unidentified object at first candidate locations on the unidentified object associated with the first feature;
  a first output circuit of the first inference system coupled to the first input circuit, the first output circuit configured to determine a first output representation corresponding to the first input representation by processing the first input representation, the first output representation indicating a first set of candidate objects associated with the first set of candidate pairs;
  a second input circuit of a second inference system at a second layer of the multi-layer system higher than the first layer, the second input circuit configured to generate a second input representation corresponding to at least the first output representation of the first output processor by processing the first output representation; and a second output circuit of the second inference system configured to determine a second output representation corresponding to the second input representation by processing the second input representation, the second output representation indicating a second set of candidate objects associated with at least the first set of candidate pairs.

26. The computing device of claim 25, wherein the first sensory input is generated by a first sensor, wherein the first input circuit is further configured to generate the first input representation by further processing the first sensory input, and wherein the second input circuit is further configured to generate the second input representation by further processing the first sensory input at the second input processor.

27. The computing device of claim 25, further comprising:

a third input circuit of a third inference system at the first layer, the third input circuit configured to generate a third input representation by processing second sensory input indicating a second set of candidate pairs, the second set of candidate pairs indicating detection of a second feature of the unidentified object at second candidate locations associated with the second feature;

a third output circuit of the third inference system coupled to the third input circuit, the third output circuit configured to determine a third output representation corresponding to the third input representation, the third output representation indicating a third set of candidate objects associated with the second set of candidate pairs, wherein the first output representation is an activation state of a subset of output cells in the first output circuit and the third output representation is an activation state of a subset of output cells in the third output circuit, and wherein second input representation at the second layer is generated by processing at least the activation states of the subset of output cells in the first output representation and the activation states of the subset of output cells in the third output representation.

\* \* \* \* \*